United States Patent
Kisaku et al.

(10) Patent No.: US 9,394,018 B2
(45) Date of Patent: Jul. 19, 2016

(54) VEHICLE BODY STRUCTURE AND METHOD FOR ASSEMBLING VEHICLE BODY STRUCTURE

(75) Inventors: Masanori Kisaku, Wako (JP); Katsumi Ochiai, Wako (JP); Yukihiko Nagai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/130,648

(22) PCT Filed: Jun. 19, 2012

(86) PCT No.: PCT/JP2012/065619
§ 371 (c)(1),
(2), (4) Date: Jan. 2, 2014

(87) PCT Pub. No.: WO2013/005567
PCT Pub. Date: Jan. 10, 2013

(65) Prior Publication Data
US 2014/0138988 A1 May 22, 2014

(30) Foreign Application Priority Data
Jul. 4, 2011 (JP) .................................. 2011-147983

(51) Int. Cl.
*B62D 65/02* (2006.01)
*B62D 33/02* (2006.01)
(Continued)

(52) U.S. Cl.
CPC .............. *B62D 65/02* (2013.01); *B62D 25/02* (2013.01); *B62D 25/06* (2013.01); *B62D 33/0222* (2013.01); *Y10T 29/49622* (2015.01)

(58) Field of Classification Search
CPC .... B62D 25/06; B62D 33/0222; B62D 25/02; B62D 65/02; Y10T 29/49622
See application file for complete search history.

(56) References Cited

U.S. PATENT DOCUMENTS 5,318,338 A * 6/1994 Ikeda ............................ 296/210
5,829,219 A * 11/1998 Sugawara et al. ............. 52/653.2
(Continued)

FOREIGN PATENT DOCUMENTS

DE 102004029740 A1 * 2/2006 ............. B62D 25/06
DE 102008051997 * 4/2010 ............. B62D 25/06
(Continued)

OTHER PUBLICATIONS

European Search Report dated Dec. 18, 2014, Application No. 12807045.5, 6 pages.
(Continued)

*Primary Examiner* — Glenn Dayoan
*Assistant Examiner* — Paul Chenevert
(74) *Attorney, Agent, or Firm* — Rankin, Hill & Clark LLP

(57) ABSTRACT

A vehicle body structure includes a roof side rail, roof arch, and roof panel. The roof side rail includes a mount portion extending inward in a vehicle-transversal direction and having a vehicle-transversally outer end portion of the roof panel mounted thereto. The roof arch includes a vehicle-transversally outer end portion that is located outside a vehicle-transversally inner end of the mount portion in the vehicle-transversal direction, joined with the roof side rail, and disposed at a position that is spaced apart downward from the vehicle-transversally outer end portion of the roof panel. At least one of the roof arch and the roof side rail includes a flange portion that extends toward the other one of the roof arch and the side rail and comes into contact with the other one of the roof arch and the roof side rail to restrict downward movement of the roof arch.

10 Claims, 14 Drawing Sheets

(51) Int. Cl.
*B62D 25/02* (2006.01)
*B62D 25/06* (2006.01)

(56) References Cited

U.S. PATENT DOCUMENTS

| | | | | |
|---|---|---|---|---|
| 5,873,618 | A * | 2/1999 | Ejima | 296/30 |
| 6,073,992 | A * | 6/2000 | Yamauchi et al. | 296/203.01 |
| 7,121,615 | B2 * | 10/2006 | Hoshino | 296/203.03 |
| 7,165,806 | B2 * | 1/2007 | Osterberg et al. | 296/203.03 |
| 7,407,222 | B2 * | 8/2008 | Anderson et al. | 296/193.06 |
| 7,806,468 | B2 * | 10/2010 | Lessmeister | 296/210 |
| 7,883,142 | B2 * | 2/2011 | Hosaka et al. | 296/210 |
| 7,900,997 | B2 * | 3/2011 | Hosaka et al. | 296/193.12 |
| 8,210,602 | B2 * | 7/2012 | Kobayashi et al. | 296/203.03 |
| 8,678,484 | B2 * | 3/2014 | Shono | 296/203.03 |
| 8,894,136 | B2 * | 11/2014 | Shono | 296/210 |
| 8,915,540 | B2 * | 12/2014 | Nishimura et al. | 296/210 |
| 8,944,494 | B2 * | 2/2015 | Nakamura et al. | 296/193.06 |
| 8,960,779 | B2 * | 2/2015 | Nishimura et al. | 296/203.03 |
| 2001/0004161 | A1 * | 6/2001 | Son | 296/203.03 |
| 2002/0014008 | A1 * | 2/2002 | Sato et al. | 29/897.2 |
| 2004/0094992 | A1 * | 5/2004 | Bohm et al. | 296/210 |
| 2004/0212222 | A1 * | 10/2004 | Katsuma | 296/203.03 |
| 2011/0163571 | A1 * | 7/2011 | Furusako et al. | 296/193.06 |
| 2011/0266837 | A1 * | 11/2011 | Losch et al. | 296/193.06 |
| 2013/0082484 | A1 * | 4/2013 | Wagner et al. | 296/210 |
| 2014/0008940 | A1 * | 1/2014 | Adamski | 296/210 |
| 2014/0225399 | A1 * | 8/2014 | Ono | 296/210 |
| 2014/0312656 | A1 * | 10/2014 | Gim et al. | 296/210 |
| 2015/0367794 | A1 * | 12/2015 | Nishimura | B62D 25/04 296/187.13 |

FOREIGN PATENT DOCUMENTS

| | | | | | |
|---|---|---|---|---|---|
| DE | 102013019591 | | * | 5/2014 | B62D 25/06 |
| DE | 102013113552 | | * | 6/2015 | B62D 25/06 |
| EP | 2420432 | A1 | * | 2/2012 | B62D 25/06 |
| GB | 2303589 | A | * | 2/1997 | B62D 25/00 |
| JP | 58-149866 | | | 9/1983 | |
| JP | 09076937 | A | * | 3/1997 | B62D 25/04 |
| JP | 10167114 | A | * | 6/1998 | B62D 25/06 |
| JP | 10278841 | A | * | 10/1998 | B62D 25/06 |
| JP | 2003-118634 | | | 4/2003 | |
| JP | 2005313734 | A | * | 11/2005 | B62D 25/04 |
| JP | 2006-327284 | | | 12/2006 | |
| JP | 2007030716 | A | * | 2/2007 | B62D 25/06 |
| JP | 2008247189 | A | * | 10/2008 | B62D 25/06 |
| JP | 2009-214561 | | | 9/2009 | |
| WO | WO 2012168612 | A1 | * | 12/2012 | B62D 25/04 |
| WO | WO 2015076195 | A1 | * | 5/2015 | B62D 25/06 |

OTHER PUBLICATIONS

Chinese Office Action dated May 29, 2015, 7 pages.

* cited by examiner

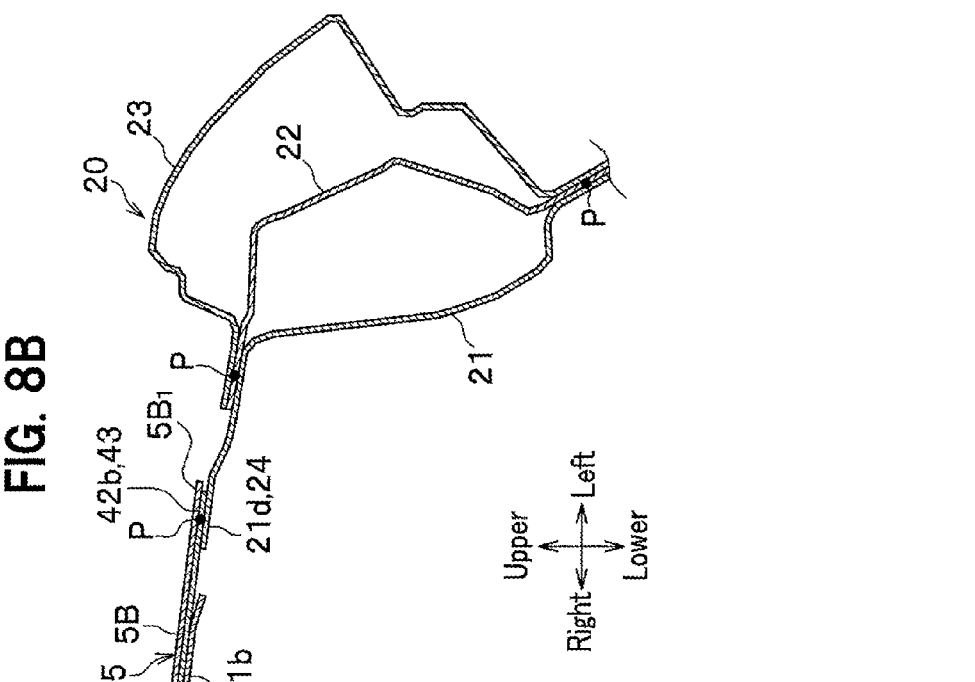
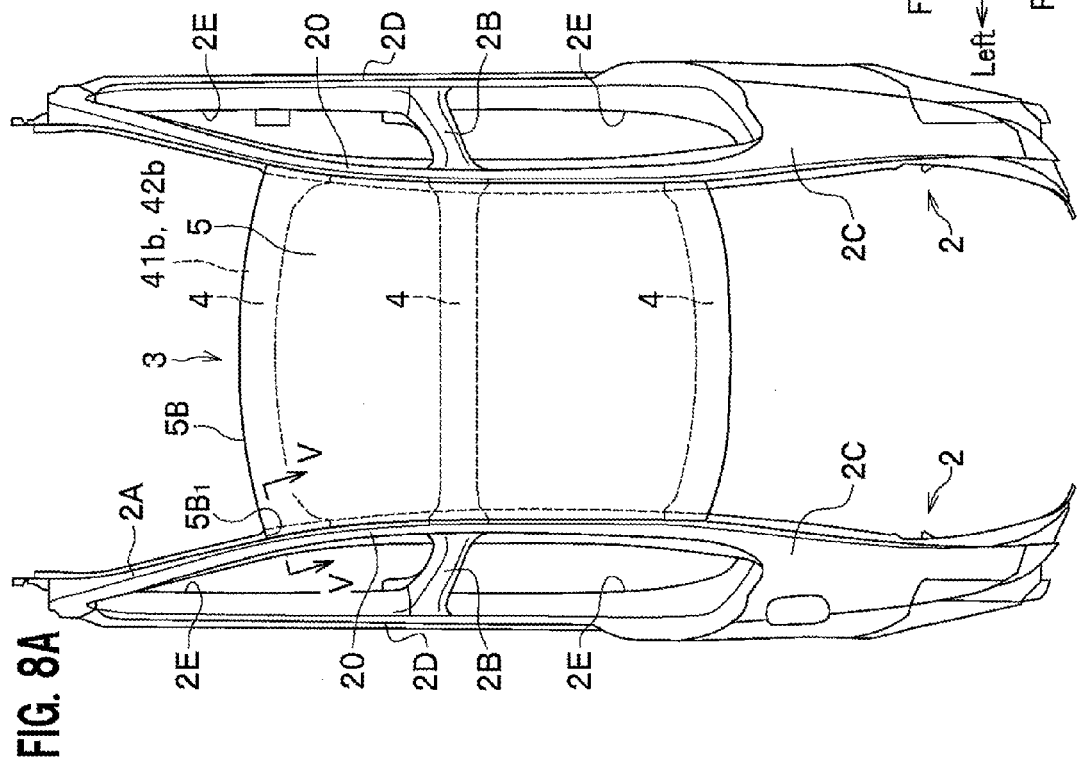

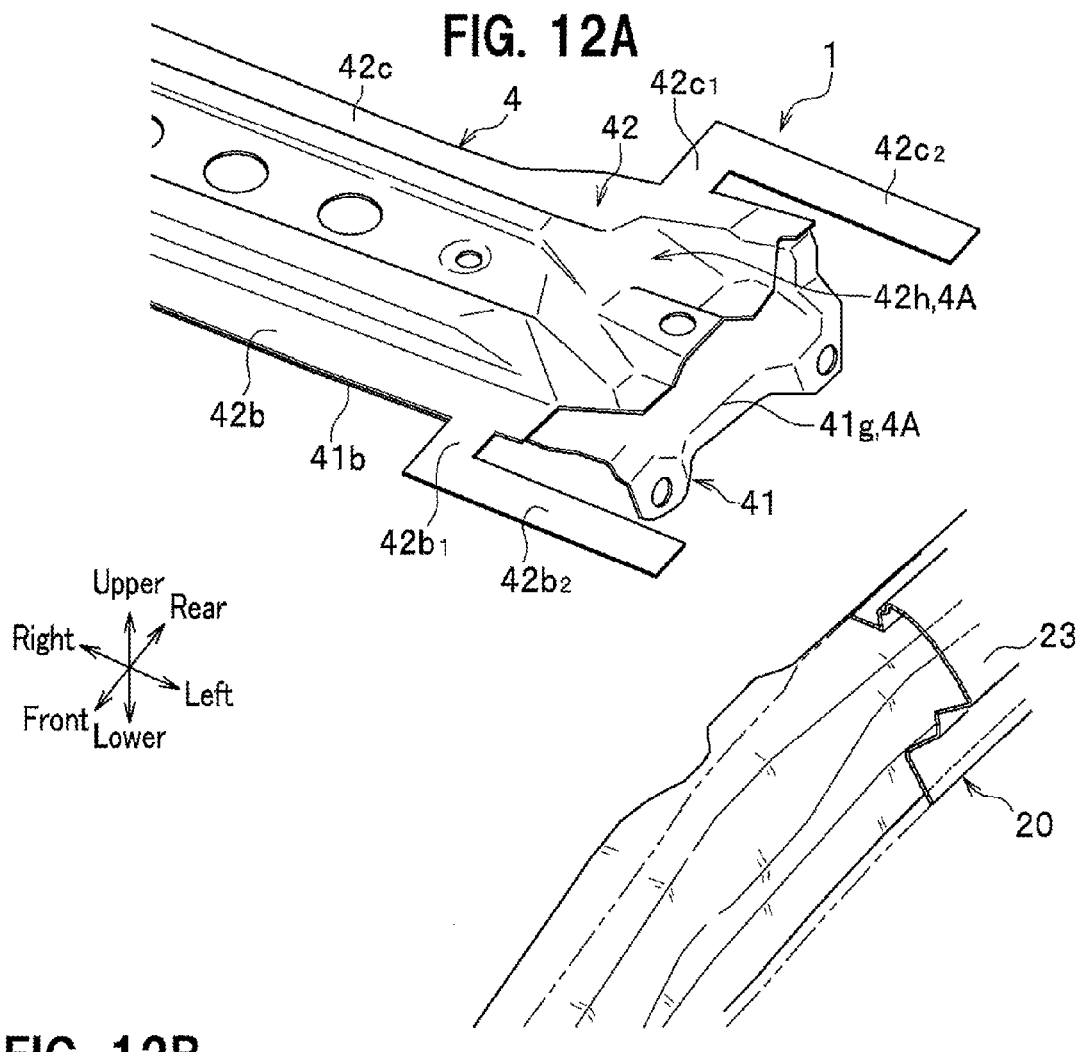

VEHICLE BODY STRUCTURE AND METHOD FOR ASSEMBLING VEHICLE BODY STRUCTURE

TECHNICAL FIELD

The present invention relates to a vehicle body structure and a method for assembling a vehicle body structure.

BACKGROUND ART

Conventionally, a roof panel forming the upper surface of a vehicle body is arranged between a pair of side components that are provided on the left side and the right side of the vehicle body and form the sides portions of the vehicle body, and roof arches are arranged to reinforce the upper portion of the vehicle body, the upper portion including the roof panel.

FIG. 14A is a partial vertical cross-sectional view of a vehicle body structure in a conventional example in Patent Document 1, with a cut in the vehicle-transversal direction, and FIG. 14B is a partial vertical cross-sectional view of the vehicle body structure disclosed by Patent Document 1, with a cut in the vehicle-transversal direction.

For example, as shown in FIG. 14A, an invention is taken as a conventional example in Patent Document 1, wherein a side component 100 includes a roof side inner 110 disposed on the vehicle interior side and a roof side outer 120 disposed on the vehicle exterior side of the roof side inner 110, wherein the outer end portion of the roof arch 130 in the vehicle-transversal direction is fixed on the vehicle interior side of the roof side inner 110, and the outer end portion of the roof panel 140 in the vehicle-transversal direction is fixed on the vehicle exterior side of the roof side outer 120.

According to this invention, if the roof arch 130 is mounted onto the side component 100 from above, these two interfere with each other so that the roof arch 130 cannot be disposed on the vehicle interior side of the roof side inner 110. Accordingly, the roof arch 130 needs to be carried onto the narrow vehicle interior side to be attached, which makes the workability in assembling low, and makes automatization of assembling work difficult.

In this situation, in the invention disclosed by Patent Document 1, as shown in FIG. 14B, an outer end portion of a roof arch 230 in the vehicle-transversal direction is subjected to crush processing, and the portion 230A, whose cross-sectional shape has been crushed, is fixed to the upper portion of a side component 200. Thus, by this structure, the roof arch 230 is mounted onto the side component 200 from above so that the workability in assembling is improved, and automatization of assembling work is easily attained. Incidentally, the reference numbers in FIG. 14B for like parts of FIG. 14A are increased by 100.

However, in the invention disclosed by Patent Document 1, as there are portions with a crushed cross-sectional shape, strength and stiffness are decreased, which causes problems that forces for reducing vibration and noises generated during driving of the vehicle are decreased, or the distortion amount of the vehicle body increases when lateral collision, rollover (overturn), or the like has occurred.

FIG. 15A is a plan view showing the vehicle body structure by the invention disclosed by Patent Document 2, and FIG. 15B is a cross-sectional view, taken along line VII-VII in FIG. 15A.

As a solution of the above-described problems, Patent Document 2 discloses an invention, as shown in FIGS. 15A and 15B, wherein a roof arch 300 is structured by joining a roof rail outer 310 and a roof rail inner 320 such as to form a closed cross-section, and an extension member 330 and a pillar reinforce member 340, which are joined such as to form a closed cross-section, are fixed to a side component 350 (the upper surface of a roof side inner 360 in more detail).

Further, in the invention disclosed by Patent Document 2, as shown in FIG. 15B, the end edge 310A of the roof outer 310 protrudes in the vehicle-transversal direction outside the end edge 320A of the roof rail inner 320. Further, the end edge 330A of the extension member 330 protrudes vehicle-transversally toward the center from the end edge 340A of a pillar reinforce member 340, and the end edge 310A of the roof rail outer 310 is mounted and fixed on the end edge 340A of the pillar reinforce member 340. Still further, the end edge 320A of the roof rail inner 320 is mounted and fixed on the end edge 330A of the extension member 330.

That is, according to the invention disclosed by Patent Document 2, as the roof arch 300 (the roof rail outer 310 and the roof rail inner 320) is mounted from above the side component 350 (the extension member 330 and the pillar reinforce member 340), assemblability improves and automatization of assembling work becomes easy. Further, on the other hand, as it is possible to connect these without crushing the cross-sectional shape (closed cross-section) of these, strength and stiffness are increased, compared with the invention disclosed by Patent Document 1 in which portions with a crushed cross-section are included.

PRIOR ART DOCUMENTS

Patent Documents

Patent Document 1: Japanese Patent Application Laid-Open No. S58-149866
Patent Document 2: Japanese Patent Application Laid-Open No. 2003-118634

SUMMARY OF THE INVENTION

Problems to be Solved by the Invention

However, according to the invention disclosed by Patent Document 1, as portions with a crushed cross-sectional shape are included, a problem is caused the strength and stiffness decreases. On the other hand, according to the invention disclosed by Patent Document 2, extension members and pillar reinforce members are further necessary, the number of components increases, and the number of joining points thus increases, causing a problem that strength and stiffness are not adequately ensured.

Further, according to the invention disclosed by Patent Document 2, it is inevitably necessary to provide a clearance between the front wall of an extension member and the front wall of a roof rail inner, taking into account a tolerance, and as it is not possible to join these with each other at the gap portion, strength and stiffness are further decreased.

The present invention has been developed in this point of view, and an object of the invention is to provide a vehicle body structure and a method for assembling a vehicle body structure wherein workability during assembly is satisfactory, automatization of assembling work is easy, and further, strength and stiffness is adequately ensured.

Means for Solving the Problems

In order to solve the above-described problems, a vehicle body structure according to the present invention includes: a pair of side components that are provided on left and right sides of a vehicle body and form side portions of the vehicle body; and a roof component including a roof arch disposed between paired side components; and a roof panel fitted to an upper portion than the roof arch and forming an upper surface of the vehicle body, wherein the side components each include a roof side rail disposed at an upper side edge of the vehicle body and extending in a front or rear direction, wherein the each roof side rail includes a mount portion extending inward in the vehicle-transversal direction and having a vehicle-transversally outer end portion of the roof panel mounted thereto, wherein the roof arch includes a vehicle-transversally outer end portion that is located outside a vehicle-transversally inner end of the mount portion in the vehicle-transversal direction and is joined with the roof side rail, wherein the vehicle-transversally outer end portion of the roof arch is disposed at a position spaced apart from the vehicle-transversally outer end portion of the roof panel in a downward direction, wherein at least one of the roof arch and the roof side rail includes a flange portion that extends toward the other one of the roof arch and the roof side rail and comes into contact with said other one of the roof arch and the roof side rail to restrict downward movement of the roof arch, wherein the flange portion is located at a position upper than the vehicle-transversally outer end portion of the roof arch, wherein the mount portion is located between the roof panel and the roof arch with said other one of the roof arch and the roof side rail being in contact with the flange portion, and wherein the mount portion has the vehicle-transversally outer end portion of the roof panel mounted thereon.

According to the present invention, the vehicle-transversally outer end portion of the roof arch is disposed at a position that is spaced apart downward from the vehicle-transversally outer end portion of the roof panel, and the roof side rail is provided with a mount portion that extends inward in the vehicle-transversal direction and has the vehicle-transversally outer end portion of the roof panel mounted thereon. Accordingly, after disposing the mount portion of the roof side rail from outside in the vehicle-transversal direction to positions between the roof arch and the roof panel, which have been integrally attached to each other in advance, it is possible to easily attach a roof component to the side component by just mounting the roof panel from above onto the mount portion, which attains satisfactory workability in assembling and makes automation of assembly work easy.

Further, according to the present invention, at least one of the roof arch and the roof side rail extends toward the other one of the roof arch and the roof side rail and includes a flange portion that contacts with said other one of the roof arch and the roof side rail to restrict downward movement of the roof arch. It is thereby possible to define the position of the roof component relative to the side component in the upper or lower direction, and mount the vehicle-transversally outer end portion of the roof panel onto the mount portion with said other one of the roof arch and the roof side rail and the flange portion being in contact with each other. Accordingly, as it is possible to support a roof arch by flange portions while supporting a roof panel by mount portions, a roof component is stably attached to side components.

Further, according to the present embodiment, the vehicle-transversally outer end portion of a roof arch is located in the vehicle-transversal direction outside the vehicle-transversally inner end portion of the mount portion, and is directly joined with the roof side rail. Thus, it is unnecessary to crush the cross-sectional shape of a roof arch, and the strength and the stiffness are increased, compared with the conventional technology (the invention disclosed by Patent Document 1) in which a roof arch has a portion with a crushed cross-sectional shape. Still further, according to the present embodiment, as it is not necessary to use extension members nor pillar reinforcing members, the number of joint points is thereby decreased. As a result, a higher strength and stiffness are ensured, compared with the conventional technology (the invention disclosed by Patent Document 2) which uses extension members and pillar reinforcing members.

Further, the flange portion preferably includes: a first flange portion formed on the roof arch; and a second flange portion formed on the roof side rail and disposed at a position where the second flange portion and the first flange portion vertically overlap with each other.

By this structure, as the flange portions are formed on both the roof arch and the roof side rail, the shapes of flange portions are simplified, compared with a case of forming a flange portion on only one of a roof arch and a roof side rail, and the formability of flange portions is thereby improved.

Still further, arrangement is preferably made such that: the roof arch is formed by joining an arch lower and an arch upper disposed at a position upper than the arch lower such as to form a closed cross-section; the first flange portion includes a front arch flange portion extending forward from a front end portion of the roof arch and a rear arch flange portion extending backward from a rear end portion of the roof arch; and the front arch flange portion is formed by one of the arch lower and the arch upper; and the rear arch flange portion is formed by both the arch lower and the arch upper.

If a front arch flange portion were formed by both an arch lower and an arch upper, then four members of the arch lower, the arch upper, a roof side rail, and a roof panel would be joined together, and satisfactory joint could not be made, causing a drop in the joint strength. In contrast, by the above-described structure, as a front arch flange portion is formed on one of an arch lower and an arch upper, three members of the arch lower (or the arch upper), a roof side rail, and a roof panel are joined together, and it is thereby possible to decrease the number of joint points and increase the joint strength at joint portions.

Further, by this structure, as a rear arch flange portion is formed by both an arch lower and an arch upper, the strength of the rear arch flange portion is increased.

Yet further, arrangement is preferably made such that: the roof side rail is formed by joining a roof side inner on a vehicle interior side and a roof side stiffener on a vehicle exterior side such as to form a closed cross-section; the second flange portion includes a front rail flange portion extending inward in the vehicle-transversal direction from a vehicle-transversally inner end portion of the roof side rail, and a rear rail flange portion provided with a predetermined interval backward from the front rail flange portion and extending inward in the vehicle-transversal direction from the vehicle-transversally inner end portion of the roof side rail; and the front rail flange portion is formed by one of the roof side inner and the roof side stiffener; and the rear rail flange portion is formed by both the roof side inner and the roof side stiffener.

If a front rail flange portion were formed by both the roof side inner and the roof side stiffener, then four members of the roof side inner, the roof side stiffener, the roof arch, and the roof panel would be joined together, and satisfactory joint could not be made, causing a drop in the joint strength. In contrast, by the above-described structure, as the front rail flange portion is formed by one of the roof side inner and the roof side stiffener, three members of the roof side inner (or the roof side stiffener), the roof arch, and the roof panel are joined together, and it is thereby possible to decrease the number of joint points and increase the joint strength at joint portions.

Further, by this structure, as the rear rail flange portion is formed by both the roof side inner and the roof side stiffener, the strength of the rear arch flange portion is increased.

Further, the first flange portion preferably includes a flange extension portion that extends outward in the vehicle-transversal direction and is joined with the vehicle-transversally outer end portion of the roof panel.

By this structure, as the roof arch includes the flange extension portion to join with a roof panel, positioning of the both is accurately performed in attaching the roof arch and the roof panel to each other, which improves the accuracy of the relative position between the two.

Still further, the flange portion preferably includes an extension portion extending inward in the vehicle-transversal direction from the roof side rail, at a position that is offset in the front or rear direction from the roof arch, and a support portion extending from an extension end of the extension portion to a lower side of the roof arch.

By this structure, as a flange portion is formed on a roof side rail, the shape of a roof arch is simplified to thereby improve the formability of the roof arch, compared with a case of forming a flange portion also on the roof arch.

Yet further, the flange portion preferably includes an extension portion extending in the front or rear direction from a position that is spaced apart inward in the vehicle-transversal direction at a predetermined interval from the vehicle-transversally outer end portion of the roof arch, and a support portion extending from an extension end of the extension portion to an upper side of the roof side rail.

By this structure, as a flange portion is formed to a roof arch, the shape of the roof side rail is simplified to thereby improve the formability of the roof side rail, compared with a case of forming a flange portion on a roof side rail.

Further, arrangement is preferably made such that: the vehicle-transversally outer end portion of the roof arch is provided with an arch-side joint portion extending in a vertical direction; and a vehicle-transversally inner end portion of the roof side rail is provided with a rail-side joint portion extending in parallel with the arch-side joint portion.

For example, if an arch-side joint portion were inclined such as to be located on the outer side in the vehicle-transversal direction as extending from a lower part to an upper part, as the angle between a portion of a roof arch, the portion extending in the vehicle-transversal direction, and an arch-side joint portion would become acute (smaller than 90 degrees), the formability of the roof arch would degrade.

On the other hand, if an arch-side joint portion were inclined such as to be located on the inner side in the vehicle-transversal direction as extending from a lower portion to an upper portion, the joint surface between the arch-side joint portion and the rail-side joint portion would incline. Thus, in attaching a roof component and a side component to each other, as it is necessary to simultaneously move the roof component downward and move the side component inward in the vehicle-transversal direction, which would make the attaching work of these complicated.

In this situation, an arch-side joint portion extends in the vertical direction; a rail-side joint portion extends in parallel with the arch-side joint portion; and thus the joining surface of the both becomes vertical. The formability of a roof arch thereby becomes satisfactory. Further, a side component is moved in the vehicle-transversal direction toward a roof component; the rail-side joint portion abuts against the arch-side joint portion to define the position in the vehicle-transversal direction; and thereafter the roof component is vertically moved to enable position adjustment. Accordingly, it is unnecessary to simultaneously move the roof component downward and move the side component inward in the vehicle-transversal direction, and the work for attaching the both to each other thereby becomes simple and easy.

Still further, the roof-side inner and the roof-side stiffener are preferably joined at respective joint portions provided between the front rail flange portion and the rear rail flange portion.

In the conventional technology (the invention disclosed by Patent Document 2), as an extension member was provided at a position of intersection between a roof side rail and a roof arch, the point also being between the roof-side inner and the roof-side stiffener, the roof-side inner and the roof-side stiffener could not be directly joined with each other at the intersection portion, and the stiffness of the closed cross-section of the roof side rail decreased.

In this situation, a joint portion is provided at a position between a front rail flange portion and a rear tail flange portion, the front rail flange portion and the rear tail flange portion forming an intersection portion between a roof side rail and a roof arch, and a roof side inner and a roof side stiffener are joined through this joint portion. Thus, the roof side inner and the roof side stiffener is directly joined with each other even at this intersection portion, and accordingly the stiffness of the closed cross-section of the roof side rail can be increased.

Yet further, arrangement is preferably made such that: the side components each include a pillar including an upper end portion joined with the roof side rail; and the upper end portion of the pillar extends to a position where the upper end portion of the pillar overlaps with the arch-side joint portion and the rail-side joint portion in the vehicle-transversal direction, and the upper end portion of the pillar is integrally joined with the arch-side joint portion and the rail-side joint portion.

By such a structure, as the roof side rail, the pillar, and the roof arch are integrally joined, the number of joint points is decreased, and the stiffness at the intersection portion between the roof side rail, the pillar, and the roof arch is increased.

In order to solve the above-described problems, a method, according to the present invention, for assembling a vehicle body structure, including: providing a pair of side components that are provided on left and right sides of a vehicle body and form side portions of the vehicle body; providing a roof component including a roof arch disposed between paired side components and a roof panel fitted to an upper part of the roof arch and forming an upper surface of the vehicle body; having the side components each include a roof side rail that is disposed at an upper side edge of the vehicle body and extends in a front or rear direction; having the roof side rail include a mount portion that extends inward in a vehicle-transversal direction and has a vehicle-transversally outer end portion of the roof panel mounted thereto; and locating a vehicle-transversally outer end portion of the roof arch outside a vehicle-transversally inner end of the mount portion in the vehicle-transversal direction to join the vehicle-transversally outer end portion of the roof arch with the roof side rail; and disposing the vehicle-transversally outer end portion of the roof arch at a position that is spaced apart downward from the vehicle-transversally outer end portion of the roof panel; a first process for disposing the mount portion of the roof side rail between the vehicle-transversally outer end portion of the roof arch and the vehicle-transversally outer end portion of the roof panel; and a second process for mounting the vehicle-transversally outer end portion of the roof panel onto the mount portion.

According to the present invention, the vehicle-transversally outer end portion of the roof arch is disposed at a position that is spaced apart downward from the vehicle-transversally outer end portion of the roof panel, and the roof side rail is provided with a mount portion that extends inward in the vehicle-transversal direction, wherein the vehicle-transversally outer end portion of the roof panel is mounted on the mount portion. Accordingly, after disposing the mount portion of the roof side rail from outside in the vehicle-transversal direction to a position between the roof arch and the roof panel, which have been integrally attached to each other in advance, it is possible to easily attach a roof component to a side component by just mounting the roof panel from above onto the mount portion, which attains satisfactory workability in assembling and makes automation of assembly work easy.

Further, according to the present embodiment, the vehicle-transversally outer end portion of the roof arch is located outside the vehicle-transversally inner end of the mount portion in the vehicle-transversal direction, and is directly joined with the roof side rail. Thus, it is unnecessary to crush the cross-sectional shape of a roof arch, and the strength and the stiffness are increased, compared with the conventional technology (the invention disclosed by Patent Document 1) in which a roof arch has a portion with a crushed cross-sectional shape. Still further, according to the present embodiment, as it is not necessary to use extension members nor pillar reinforcing members, the number of joint points is thereby decreased. As a result, a higher strength and stiffness are ensured, compared with the conventional technology (the invention disclosed by Patent Document 2) which uses extension members and pillar reinforcing members.

Further, arrangement is preferably made such that, each start position is set to a position where the roof component is offset above from the side components, and where the vehicle-transversally inner end portion of the mount portion of each of the side components is offset outward in the vehicle-transversal direction from the vehicle-transversally outer end portion of the roof component, the first process includes: a dropping process for moving downward the roof component relatively to the side component to dispose the mount portion of the roof side rail at a position where the mount portion overlaps, in the vehicle-transversal direction, with a space between the vehicle-transversally outer end portion of the roof panel and the vehicle-transversally outer end portion of the roof arch; and an inserting process after the dropping process, for moving the side component inward in the vehicle-transversal direction to dispose the mount portion of the roof side rail at a position where the mount portion overlaps, in the upper or lower direction, with the space between the vehicle-transversally outer end portion of the roof panel and the vehicle-transversally outer end portion of the roof arch.

Compared with the conventional technology (the invention disclosed by Patent Document 2) in which roof arches and a roof panel are mounted onto side components from above, it is possible by the above-described arrangement to assemble a vehicle body structure for which strength and stiffness are appropriately ensured by only adding two processes, namely a dropping process and an inserting process. That is, even without a significant modification of conventional assembling processes, a vehicle body structure, for which strength and stiffness are appropriately ensured, is assembled, and as significant change in the facility on an assembling line or the working attitude of a worker is unnecessary, it is possible to reduce an increase in manufacturing cost and an increase in the working load on the worker even with an increase in the number of assembling processes.

Advantages of the Invention

According to the present invention, a vehicle body structure and a method for assembling a vehicle body structure is provided, which have the workability during assembly satisfactory, the automatization of assembling work easy, and further, strength and stiffness adequately ensured.

BRIEF DESCRIPTION OF THE DRAWINGS

FIG. 8A is a plan view of the vehicle body structure in the above embodiment, and FIG. 8B is a cross-sectional view taken along line V-V in FIG. 8A;

FIG. 12A is a partial exploded perspective cut view showing a side rail and a roof arch of a vehicle body structure in another modified example, and FIG. 12B is a vertical cross-sectional view of the vehicle body structure in the other modified example, with a cut in the vehicle-transversal direction;

EMBODIMENT FOR CARRYING OUT THE INVENTION

Figure 1:
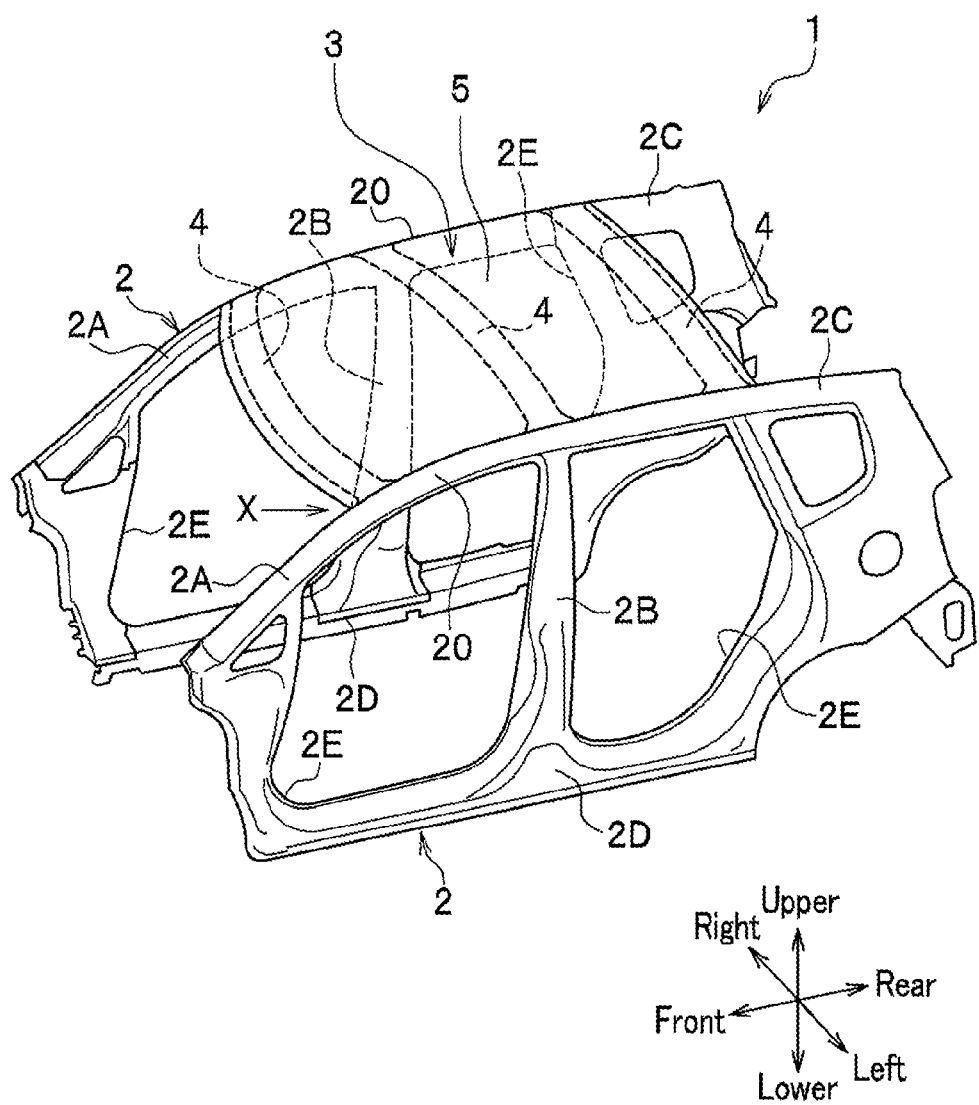
FIG. 1 is a schematic perspective view of a vehicle body structure in an embodiment.

An embodiment according to the present invention will be described below in detail, referring to the drawings. In the description, the same reference symbols will be assigned to the same elements, and redundant description will be omitted.

In representing directions in the following description, the front, rear, left, right, upper, or lower side of a vehicle will be referred to. Incidentally, 'vehicle-transversal direction' and 'left or right direction' means the same.

FIG. 1 is a schematic perspective view of a vehicle body structure 1 in an embodiment.

As shown in FIG. 1, the vehicle body structure 1 in the present embodiment is a structure for connecting a pair of side components 2, 2, which are provided on the left and right sides of a vehicle body to form the lateral side portions of the vehicle body, and a roof component 3, which forms the upper portion of the vehicle body.

Incidentally, as the side components 2, 2 are bilaterally symmetric, only the side component 2 on the left side will be described in the following description, and description of the side component 2 on the right side will be omitted.

As shown in FIG. 1, a side component 2 is mainly provided with a roof side rail 20 extending in the front or rear direction along an upper side edge of the upper portion of the vehicle body, a front pillar 2A, which is connected to the front end portion of the roof side rail 20 and extends obliquely downward and forward, a center pillar 2B, whose upper end is connected to the middle portion of the roof side rail 20, and a rear pillar 2C, which is connected with the rear end portion of the roof side rail 20 and extends downward slightly obliquely and backward. In addition, the side component 2 is provided with a side sill 2D connected with the lower end of the center pillar 2B, door opening portions 2E where doors, not shown, are provided such as to be opened and closed, and others.

Figure 2:
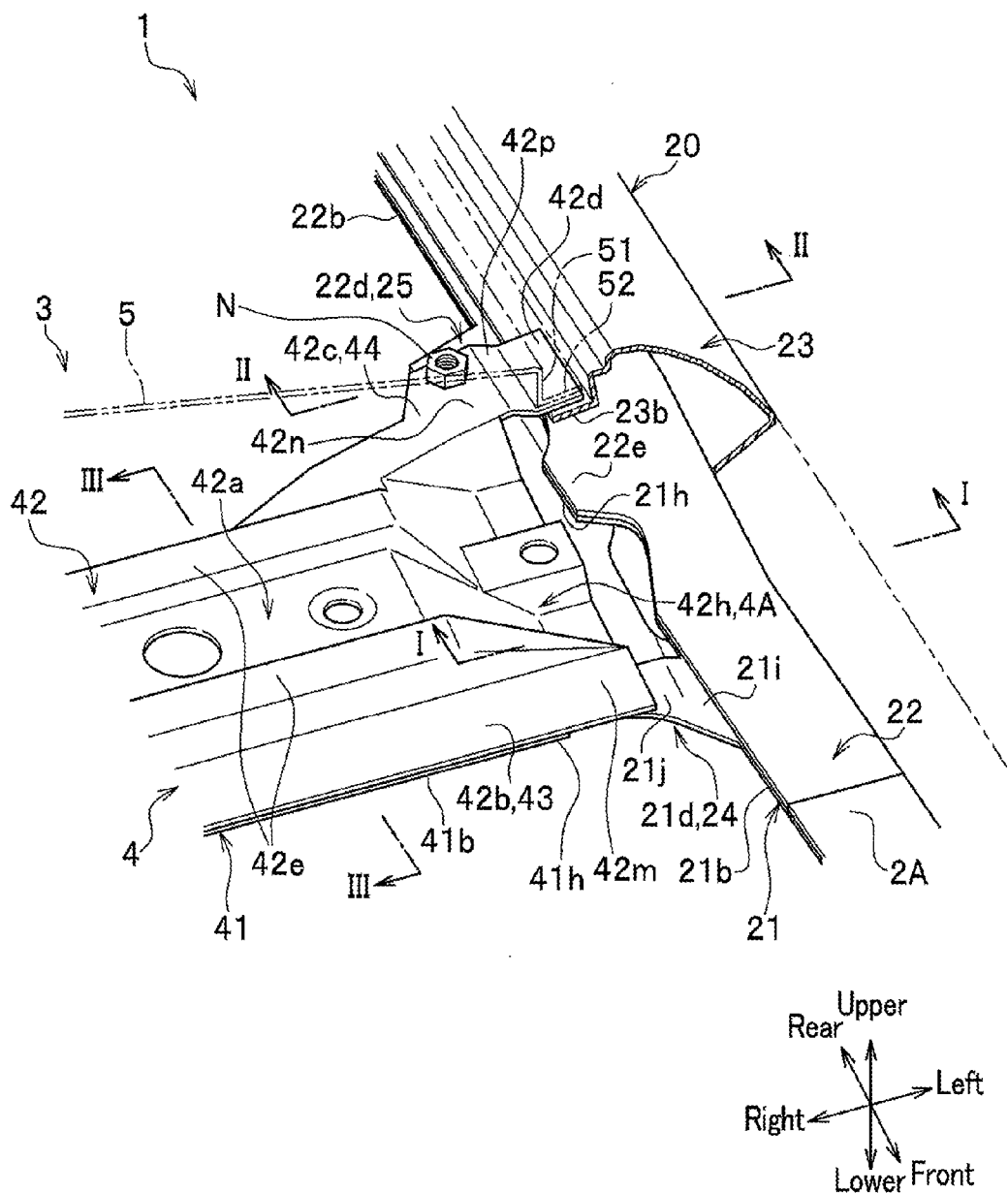
FIG. 2 is a perspective view showing a state viewed from the direction X in FIG. 1.
Figure 3:
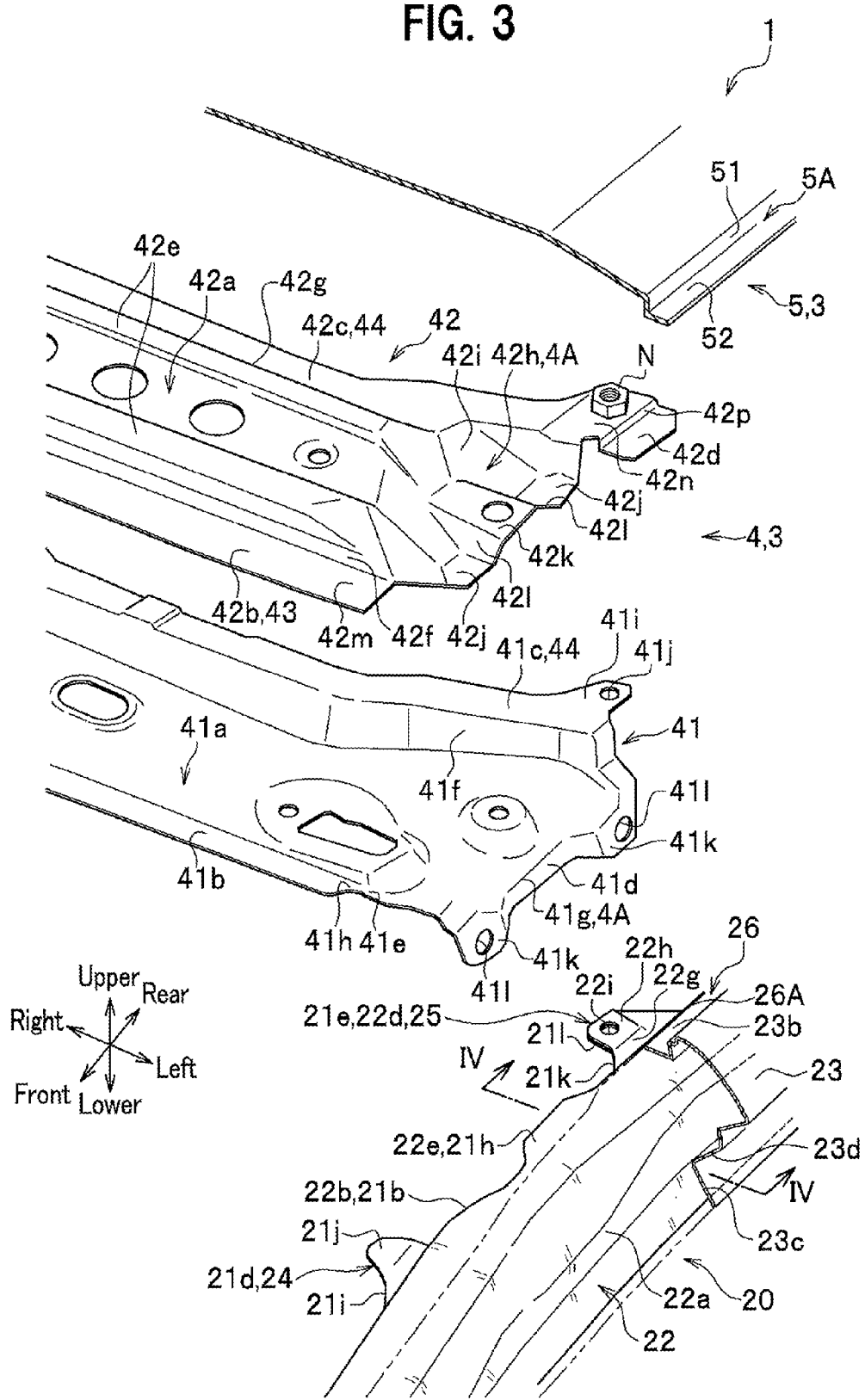
FIG. 3 is a partial exploded perspective cut view showing a roof side rail, a roof arch, and a roof panel.
Figure 4:
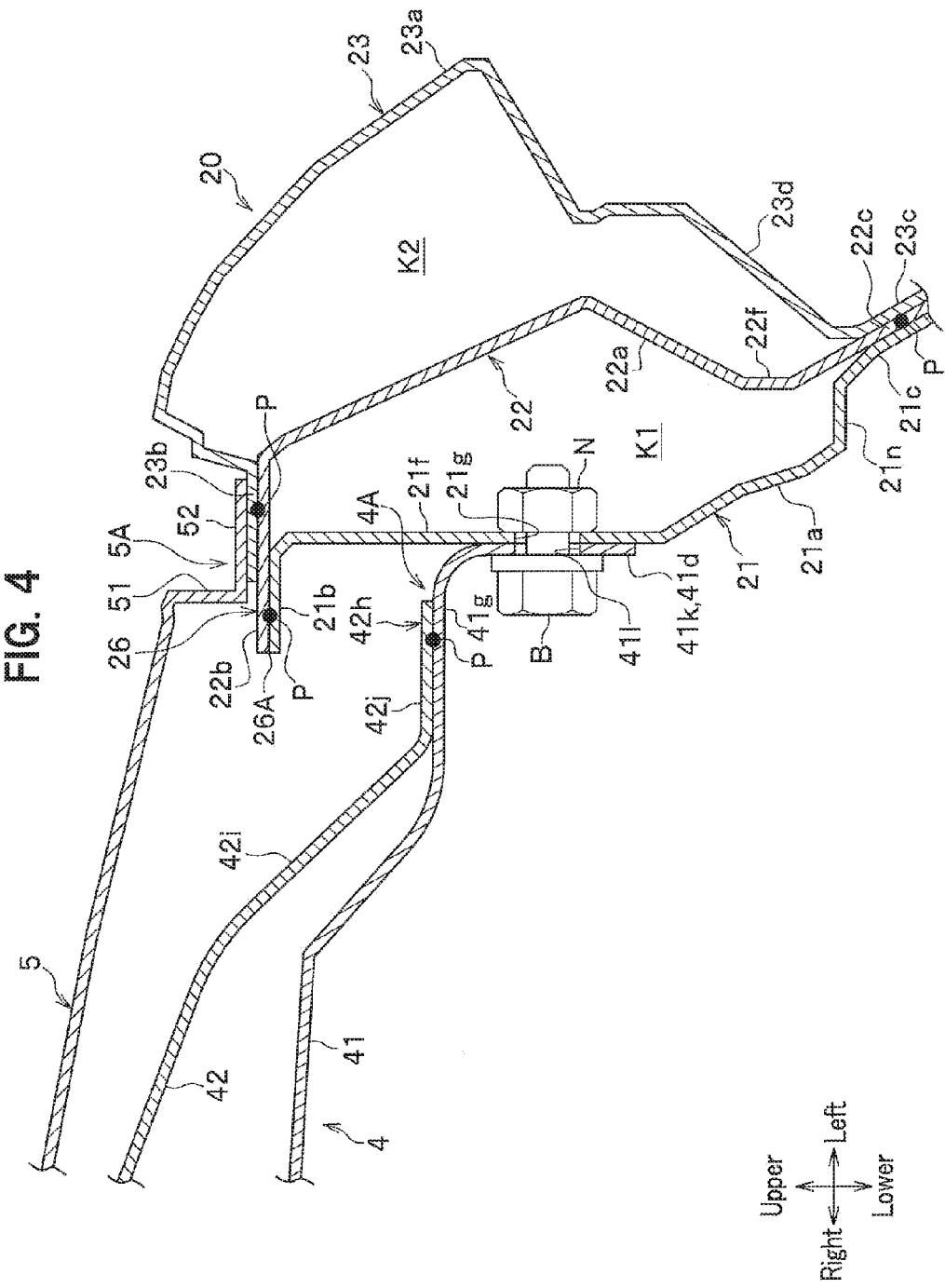
FIG. 4 is a cross-sectional view taken along line I-I in FIG. 2.
Figure 5:
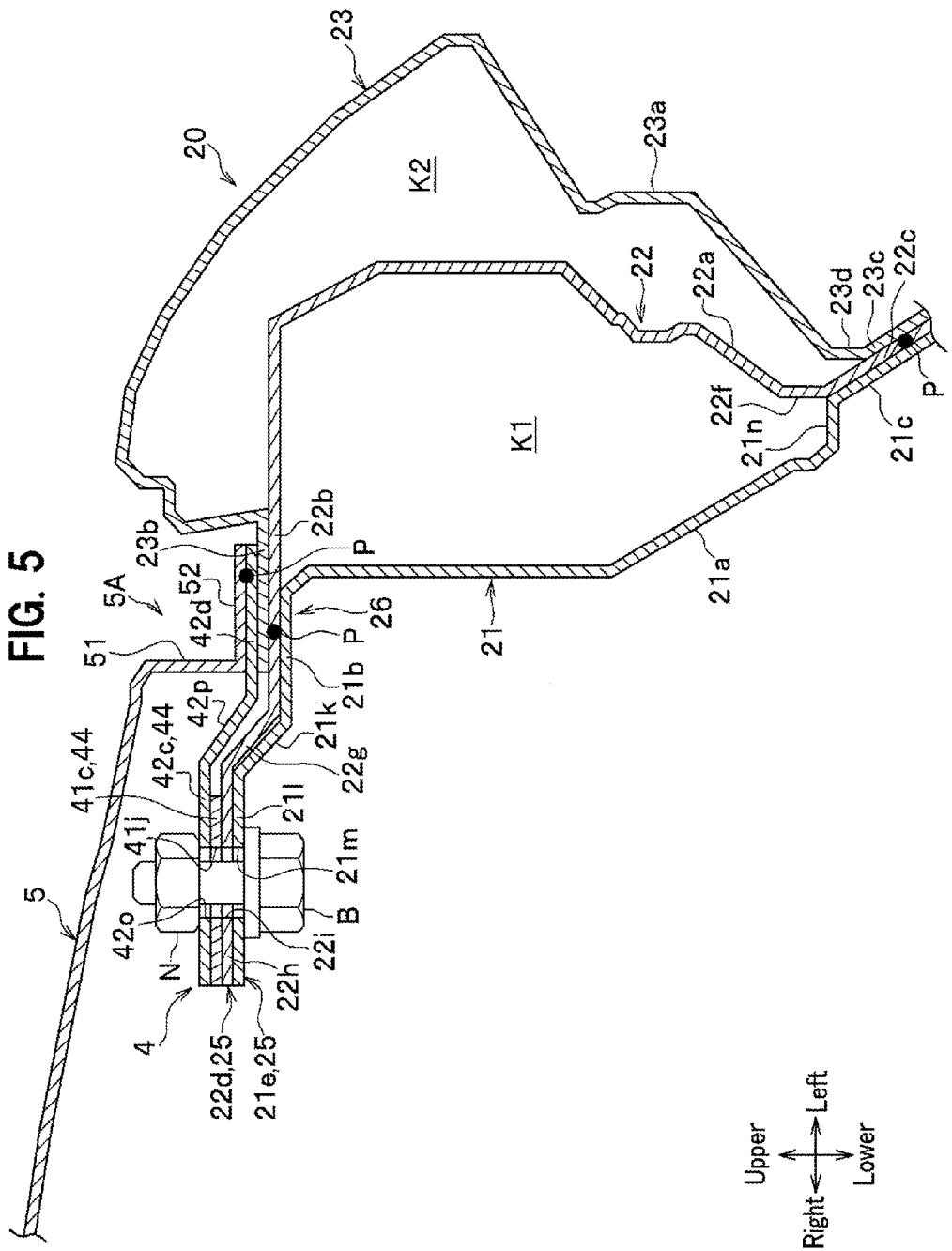
FIG. 5 is a cross-sectional view taken along line II-II in FIG. 2.
Figure 6:
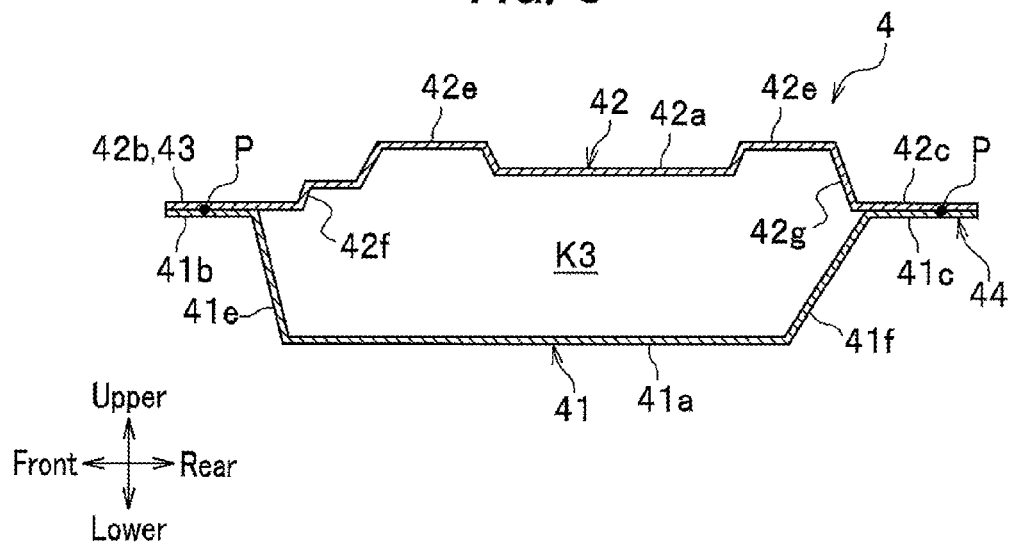
FIG. 6 is a cross-sectional view taken along line III-III in FIG. 2.
Figure 7:
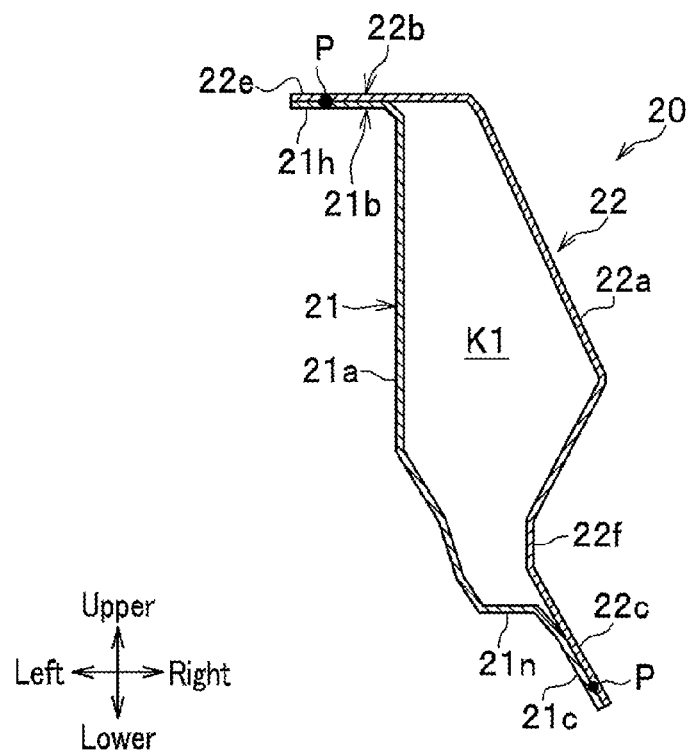
FIG. 7 is a cross-sectional view taken along line IV-IV in FIG. 3

FIG. 2 is a perspective view showing a state viewed from direction X in FIG. 1. FIG. 3 is a partial exploded perspective cut view showing the roof side rail 20, a roof arch 4, and a roof panel 5. FIG. 4 is a cross-sectional view taken along line I-I in FIG. 2. FIG. 5 is a cross-sectional view taken along line II-II in FIG. 2. FIG. 6 is a cross-sectional view taken along line III-III in FIG. 2. FIG. 7 is a cross-sectional view taken along line IV-IV in FIG. 3. FIG. 8A is a plan view of the vehicle body structure 1 in the present embodiment, and FIG. 8B is a cross-sectional view taken along line V-V in FIG. 8A. Incidentally, black dots in the figure represent welding points P.

As shown in FIG. 4, the roof side rail 20 includes a roof side inner 21, a roof side stiffener 22, and a roof side outer 23. Further, as shown in FIG. 3, the roof side rail 20 includes a front rail flange portion 24, a rear rail flange portion 25, and a mount portion 26.

The roof side inner 21, the roof side stiffener 22, and the roof side outer 23 are formed respectively by press forming of a metal plate such as a steel plate or an aluminum plate.

The front rail flange portion 24 and the rear rail flange portion 25 correspond to 'second flange portion' set forth in claims of the present application.

As shown in FIGS. 3 to 5, the roof side inner 21 includes a roof side inner main body 21a (see FIG. 4 and FIG. 5) in a plate shape provided with a bent at plural portions, an upper joint flange portion 21b (see FIG. 4 and FIG. 5) formed on the upper side of the roof side inner main body 21a, a lower joint flange portion 21c (see FIG. 4 and FIG. 5) formed on the lower side of the roof side inner main body 21a, a front flange portion 21d (see FIG. 3) extending inward in the vehicle-transversal direction from the upper joint flange portion 21b, and a rear flange portion 21e (see FIG. 3), which is provided posterior to the front flange portion 21d with a predetermined interval therebetween, extending inward in the vehicle-transversal direction from the upper joint flange portion 21b.

As shown in FIG. 4, the roof side inner main body 21a has a joint portion 21f extending downward from the vehicle-transversally outer end portion of the upper joint flange portion 21b. The joint portion 21f being a rail side joint portion is a portion for joining with a later-described arch lower 41 by a bolt B. The joint portion 21f extends in the vertical direction (upper or lower direction). The joint portion 21f is provided with a bolt through-hole 21g which a bolt B penetrates through, and a nut N is joined by welding on the backside (outside in the vehicle-transversal direction) of the bolt through-hole 21g.

As shown in FIG. 4 and FIG. 5, the upper joint flange portion 21b forming a part of the mount portion 26 has a predetermined width in the vehicle-transversal direction and extends in the front or rear direction, and is joined with the roof side stiffener 22 and the roof side outer 23 by welding. The upper joint flange portion 21b includes a portion between the front flange portion 21d and the rear flange portion 21e, and this portion is provided with a joint portion 21h extending inward in the vehicle-transversal direction, as shown in FIG. 3 and FIG. 7 (particularly as shown in FIG. 7).

As shown in FIG. 4 and FIG. 5, the lower joint flange portion 21c extends obliquely leftward and downward from the lower end portion of a step portion 21n, which is bent outward in the vehicle-transversal direction, and is joined with the roof side stiffener 22 and the roof side outer 23 by welding.

The front flange portion 21d of the front rail flange portion 24 has, as shown in FIG. 2, an extension portion 21i extending obliquely rightward and upward from the vehicle-transversally inner end portion of the upper joint flange portion 21b, and a support portion 21j extending inward in the vehicle-transversal direction from the upper end portion of the extension portion 21i.

The rear flange portion 21e forming a part of the rear rail flange portion 25 has, as shown in FIG. 5, an extension portion 21k extending obliquely rightward and upward from the vehicle-transversally inner end portion of the upper joint flange portion 21b, and a support portion 21l extending inward in the vehicle-transversal direction from the upper end portion of the extension portion 21k. The support portion 21l is provided with a bolt insertion hole 21m penetrating through the support portion 21l, wherein a bolt B is inserted through the bolt insertion hole 21m.

As shown in FIGS. 3 to 5, the roof side stiffener 22 is a member for reinforcing the roof side rail 20, and includes a roof side stiffener main body 22a (see FIG. 4) in a plate shape provided with a bent at plural portions, an upper joint flange portion 22b (see FIG. 4 and FIG. 5) formed on the upper side of the roof side stiffener main body 22a, a lower joint flange portion 22c (see FIG. 4 and FIG. 5) formed on the lower side of the roof side stiffener main body 22a, and a flange portion 22d (see FIG. 5) extending inward in the vehicle-transversal direction from the upper joint flange portion 22b The roof side stiffener main body 22a is joined with the roof side inner 21 by welding at the upper joint flange portion 22b and the lower joint flange portion 22c. Thus, the roof side inner 21 and the roof side stiffener 22 form a closed cross-section K1.

The upper joint flange portion 22b forming a part of the mount portion 26 has a predetermined width in the vehicle-transversal direction and extends in the front or rear direction, as shown in FIG. 4 and FIG. 5, wherein the roof side inner 21 and the roof side outer 23 are joined by welding with the upper joint flange portion 22b. The upper joint flange portion 22b include a portion in front of the flange portion 22d, and this portion is provided with a joint portion 22e extending inward in the vehicle-transversal direction, as shown in FIG. 3 and FIG. 7 (particularly as shown in FIG. 7). The joint portion 22e is joined, in contact, with the upper surface of the joint portion 21h of the roof side inner 21 by welding.

As shown in FIG. 4 and FIG. 5, the lower joint flange portion 22c extends obliquely leftward and downward from the lower end portion of a step portion 22f, and is joined with the roof side inner 21 and the roof side outer 23 by welding.

The flange portion 22d forming a part of the rear rail flange portion 25 includes, as shown in FIG. 3 and FIG. 5, an extension portion 22g extending obliquely rightward and upward from the vehicle-transversally inner end portion of the upper joint flange portion 22b, and a support portion 22h extended inward in the vehicle-transversal direction from the upper end portion of the extension portion 22g. The support portion 22h is provided with a bolt insertion hole 22i which a bolt B is inserted through, as shown in FIG. 5.

As shown in FIGS. 3 to 5, the roof side outer 23 includes a roof side outer main body 23a (see FIG. 4 and FIG. 5) in a plate shape provided with a bent at plural portions, an upper joint flange portion 23b (see FIG. 4 and FIG. 5) formed on the upper side of the roof side outer main body 23a, and a lower joint flange portion 23c (see FIG. 4 and FIG. 5) formed on the lower side of the roof side outer main body 23a.

The roof side outer main body 23a is joined with the roof side stiffener 22 by welding at the upper joint flange portion 23b and the lower joint flange portion 23c. Thus, the roof side stiffener 22 and the roof side outer 23 form a closed cross-section K2.

As shown in FIG. 4 and FIG. 5, the upper joint flange portion 23b forming a part of the mount portion 26 has a predetermined width in the vehicle-transversal direction, extends in the front or rear direction, and is joined by welding with the roof side inner 21 and the roof side stiffener 22.

As shown in FIG. 4 and FIG. 5, the lower joint flange portion 23c extends obliquely leftward and downward from the lower end portion of a step portion 23d bent outward in the vehicle-transversal direction, and is joined with the roof side inner 21 and the roof side stiffener 22.

The front rail flange portion 24 is formed by the front flange portion 21d, as shown in FIG. 2 and FIG. 3. That is, the front rail flange portion 24 in the present embodiment is formed by one member that is the roof side inner 21, and is integrally joined by welding with the front arch flange portion 43 of a later-described arch upper 42 and the roof panel 5 (see FIGS. 8A and 8B). Thus, three members of the roof side inner 21, the arch upper 42, and the roof panel 5 are joined together to ensure joint so that the joint strength among these can be increased. Further, the front rail flange portion 24 functions as a stopper for stopping the front arch flange portion 43 by contact with the lower surface of the front arch flange portion 43 in assembling as described later.

The rear rail flange portion 25 is formed, as shown in FIG. 3 and FIG. 5, by the rear flange portion 21e and the flange portion 22d. That is, the rear rail flange portion 25 in the present embodiment is formed by two members that are the roof side inner 21 and the roof side stiffener 22.

Thus, the strength of the rear rail flange portion 25 can be increased. The rear rail flange portion 25 is joined by a bolt B, in contact, with a later-described rear arch flange portion 44 of the roof arch 4. Further, the rear rail flange portion 25 functions as a stopper for stopping the arch flange portion 44 by contact with the lower surface of the arch flange portion 44 in assembling as described later.

As shown in FIG. 4 and FIG. 5, the mount portion 26 has a predetermined width in the vehicle-transversal direction and extends in the front or rear direction to mount the roof panel 5 thereon. The mount portion 26 is formed by laminating and joining the upper joint flange portions 21b, 22b, and 23b by welding.

Returning to FIG. 1, the roof component 3 is disposed between the pair of side components 2, 2, and formed mainly by plural roof arches 4, 4 provided with an interval between them in the front or rear direction, and the roof panel 5, which is disposed at a position upper than these roof arches 4 and forms the upper surface of the vehicle body.

Incidentally, the present embodiment will be described, taking an example of a case of applying the vehicle body structure 1 to the connecting portion between the roof arch 4, which is the frontmost one, and the side components 2. Further, as the roof component 3 is bilaterally symmetric, only the left side will be described in the following and description on the right side will be omitted.

The roof arch 4 extends in the vehicle-transversal direction and reinforces the upper part of the vehicle body including the roof panel 5. The vehicle-transversally outer end portion 4A of the roof arch 4 is, as shown in FIG. 4, disposed at a position lower than the end portion 5A of the roof panel 5 and is spaced apart from the end portion 5A. The end portion 4A is disposed in vehicle-transversal direction outside the vehicle-transversally inner end portion 26A of the mount portion 26.

As shown in FIG. 3, the roof arch 4 includes the arch lower 41, the arch upper 42, the front arch flange portion 43, and the rear arch flange portion 44. The arch lower 41 and the arch upper 42 are respectively formed by press-forming of a metal plate such as a steel plate, an aluminum plate, or the like. The front arch flange portion 43 and the rear arch flange portion 44 correspond to 'first flange portion' set forth in claims of the present application.

As shown in FIG. 3 and FIG. 6, the arch lower 41 includes an arch lower main body 41a in a recessed shape opening upward, a front flange portion 41b extending forward from the upper end portion of the front end portion 41e of the arch lower main body 41a, a rear flange portion 41c extending backward from the upper end portion of the rear end portion 41f of the arch lower main body 41a, and a side flange portion 41d extending downward from the vehicle-transversally outer end portion 41g of the arch lower main body 41a.

As shown in FIG. 3, the arch lower main body 41a is substantially in a rectangular shape in a plan view formed longitudinal in the left or right direction. The outer end portion 41g of the arch lower main body 41a in the vehicle-transversal direction is disposed at a position lower than the front flange portion 41b and the rear flange portion 41c. In other words, the front flange portion 41b and the rear flange portion 41c are formed at positions offset upward with respect to the end portion 41g. The front end portion 41e of the arch lower main body 41a is a portion in a wall shape extending obliquely upward and forward, and the rear end portion 41f is a portion in a wall shape extending obliquely upward and backward (see FIG. 6).

As shown in FIG. 3, the front flange portion 41b has a predetermined width in the front or rear direction, extends in the vehicle-transversal direction, and is joined with the arch upper 42 by welding. The outer end portion 41h of the front flange portion 41b in the vehicle-transversal direction is spaced inward apart from the front flange portion 21d of the roof side rail 20 in the vehicle-transversal direction, as shown in FIG. 2, and is disposed at a position where the end portion 41h does not overlap with the front flange portion 21d.

As shown in FIG. 3, the rear flange portion 41c forming a part of the rear arch flange portion 44 has a predetermined width in the front or rear direction, extends in the vehicle-transversal direction, and is joined with the arch upper 42 by welding or a bolt B. The outer end portion 41i of the rear flange portion 41c in the vehicle-transversal direction is formed wider in the front or rear direction, compared with other portions, and is disposed at a position vertically corresponding to the position of the rear rail flange portion 25.

As shown in FIG. 3, the side flange portion 41d is formed by downward bending the vehicle-transversally outer end portion 41g of the arch lower main body 41a, and extends in the upper or lower direction. At the front and rear end portions of the side flange portion 41d, provided are joint portions 41k, 41k that are wider in the upper or lower direction compared with other portions. Each joint portion 41k as an arch side joint portion is provided with a penetrating bolt insertion hole 41l which a bolt B is inserted through. The joint portion 41k extends, as shown in FIG. 4, parallel with the joint portion 21f of the roof side inner 21, and is joined by a bolt B, in contact, with the vehicle-transversally inner side of this joint portion 21f.

As shown in FIG. 3 and FIG. 6, the arch upper 42 includes an arch upper main body 42a in a recessed shape opening downward, a front flange portion 42b extending forward from the lower end portion of the front end portion 42f of the arch upper main body 42a, a rear flange portion 42c extending backward from the lower end portion of the rear end portion 42g of the arch upper main body 42a, a flange extension portion 42d extending outward in the vehicle-transversal direction from the rear flange portion 42c, and beads 42e formed substantially over the entire length in the vehicle-transversal direction of the arch upper main body 42a.

The arch upper main body 42a is, as shown in FIG. 3, substantially in a rectangular shape in a plan view and is formed longitudinal in the left or right direction. The arch upper main body 42a is, as shown in FIG. 6, joined with the arch lower 41 by welding or a bolt B (see FIG. 5) at the front flange portion 42b and the rear flange portion 42c. Thus, the arch lower 41 and the arch upper 42 form a closed cross-section K3. The front end portion 42f of the arch upper main body 42a is in a wall shape extending obliquely downward and forward, and the rear end portion 42g is in a wall shape extending obliquely downward and backward.

The outer end portion 42h of the arch upper main body 42a in the vehicle-transversal direction is, as shown in FIG. 3, located at a position lower than the front flange portion 42b and the rear flange portion 42c. In other words, the front flange portion 42b and the rear flange portion 42c are formed at positions offset upward from the end portion 42h.

The end portion 42h includes an inclined wall portion 42i which is inclined downward as extending outward in the vehicle-transversal direction, bottom wall portions 42j extending outward in the vehicle-transversal direction from the lower end portion of the inclined wall portion 42i, an upper wall portion 42k extending outward in the vehicle-transversal direction from the inclined wall portion 42i and being disposed at the center of the bottom wall portions 42j in the front or rear direction and higher than the bottom wall portion 42j, and step portions 42l, 42l connecting the front or rear end portions of the upper wall portion 42k and the bottom wall portions 42j. The end portion 42h is, as shown in FIG. 4, joined, in contact, with the upper surface of the end portion 41g of the arch lower main body 41a by welding. Incidentally, the end portions, 41g, 42h form the vehicle-transversally outer end portion 4A of the roof arch 4.

The front flange portion 42b forming the front arch flange portion 43 is, as shown in FIG. 3, has a predetermined width in the front or rear direction, extends in the vehicle-transversal direction, and is joined with the arch lower 41 by welding. The outer end portion 42m of the front flange portion 42b in the vehicle-transversal direction is, as shown in FIG. 2, disposed at a position vertically corresponding to the position of the front flange portion 21d.

The rear flange portion 42c forming a part of the rear arch flange portion 44 is, as shown in FIG. 3, has a predetermined width in the front or rear direction, extends in the vehicle-transversal direction, and is joined with the arch lower 41 by welding or a bolt B. The outer end portion 42n of the rear flange portion 42c in the vehicle-transversal direction is formed wider in the front or rear direction, compared with other portions, and is disposed at a position vertically corresponding to the rear rail flange portion 25 and the rear flange portion 41c. As shown in FIG. 5, the end portion 42n is provided with a bolt insertion hole 42o which a bolt B is inserted through, wherein a nut N is joined on the backside (upper side) of the bolt insertion hole 42o by welding.

The flange extension portion 42d is formed, as shown in FIG. 3, by bending toward the outside in the vehicle-transversal direction the end portion of a step portion 42p extending obliquely leftward and downward from the end portion 42n of the rear flange portion 42c, and extends in the vehicle-transversal direction. The flange extension portion 42d is disposed at a position lower than the rear flange portion 42c, and is protruding outer than the end portion 42h of the arch upper main body 42a. As shown in FIG. 5, the flange extension portion 42d is joined, in contact, with the lower surface of the roof panel 5 (flange portion 52) by welding. Thus, position definition of the roof arch 4 and the roof panel 5 can be accurately performed in assembling, and the accuracy of the relative position between the two is improved.

Returning to FIG. 3, the beads 42e are reinforcing structures for increasing the stiffness of the arch upper 42. Two beads 42e are provided in a shape convex upward, and are separated from each other in the front or rear direction.

As shown in FIG. 2 and FIG. 3, the front arch flange portion 43 is arranged such that the outer end portion 41h of the front flange portion 41b of the arch lower 41 in the vehicle-transversal direction is disposed at a position where the front flange portion 21d of the roof side rail 20 does not vertically overlap, and the outer end portion 42m of the front flange portion 42b of the arch upper 42 in the vehicle-transversal direction is disposed at a position vertically corresponding to the front flange portion 21d. Thus, the front flange portion 42b forms the front arch flange portion 43. That is, the front arch flange portion 43 in the present embodiment is formed by one member that is the arch upper 42, and is integrally joined by welding, in contact, with the upper surface of the front rail flange portion 24 and the lower surface of the roof panel 5 (see FIGS. 8A and 8B). Further, the front arch flange portion 43 comes in contact with the upper surface of the front rail flange portion 24 and is thereby stopped in assembling as described later. Thus, the downward movement of the roof component 3 relative to the side components 2 is restricted in assembling.

As shown in FIG. 3 and FIG. 5, the rear arch flange portion 44 is arranged such that the outer end portion 41i of the rear flange portion 41c of the arch lower 41 in the vehicle-transversal direction and the outer end portion 42n of the rear flange portion 42c of the arch upper 42 in the vehicle-transversal direction are disposed at a position where the end portion 41i and the end portion 42n vertically correspond to each other, and the rear flange portion 41c and the rear flange portion 42c thus form the rear arch flange portion 44. That is, the rear arch flange portion 44 in the present embodiment is formed by two members that are the arch lower 41 and the arch upper 42. The strength of the rear arch flange portion 44 can be thereby increased. The rear arch flange portion 44 is joined, in contact, with the upper surface of the rear rail flange portion 25 by a bolt B. Further, the rear arch flange portion 44 comes in contact with the upper surface of the rear rail flange portion 25 and is thus stopped in assembling as described later. Thereby, the downward movement of the roof component 3 relative to the side component 2 is restricted in assembling.

Returning to FIG. 1, the roof panel 5 forms the upper surface of the vehicle body, and is formed by press-forming of a metal plate such as a steel plate, an aluminum plate, or the like. The roof panel 5 is substantially in a rectangular form in a plan view formed longitudinal in the front or rear direction, and is disposed at a position upper than the roof arches 4, 4. As shown in FIG. 3, the outer end portion 5A of the roof panel 5 in the vehicle-transversal direction or vehicle-transversally outer end of the roof panel is provided with a step portion 51 that is bent downward and extends in the upper or lower direction, and a flange portion 52 that is formed by bending the lower end portion of the step portion 51 outward in the vehicle-transversal direction, has a predetermined width in the vehicle-transversal direction, and extends in the front or rear direction.

The flange portion 52 is mounted on the mount portion 26 of the roof side rail 20 (see FIG. 4), and is joined, in contact, with the upper surface of the flange extension portion 42d by welding (see FIG. 5).

In this case, as shown in FIG. 4, the end portion 5A of the roof panel 5 is mounted on the mount portion 26 in a state that the mount portion 26 is disposed between the end portion 4A of the roof arch 4 and the end portion 5A. Herein, the front arch flange portion 43 contacts with the upper surface of the front rail flange portion 24 (see FIG. 2), and the rear arch flange portion 44 contacts with the upper surface of the rear rail flange portion 25 (see FIG. 5).

Further, as shown in FIGS. 8A and 8B, the front end portion 5B of the roof panel 5 is disposed at a position which vertically corresponds to the front end portion (the front flange portions 41b, 42b) of the roof arch 4. The outer end portion 5B$_1$ of the front end portion 5B of the roof panel 5 in the vehicle-transversal direction is integrally joined by welding with the front rail flange portion 24 and the front arch flange portion 43.

The vehicle body structure 1 in the present embodiment is basically configured as described above. In the following, a method for assembling the vehicle body structure 1 will be described, referring to FIGS. 1 to 9F, as appropriate.

Figure 9A:
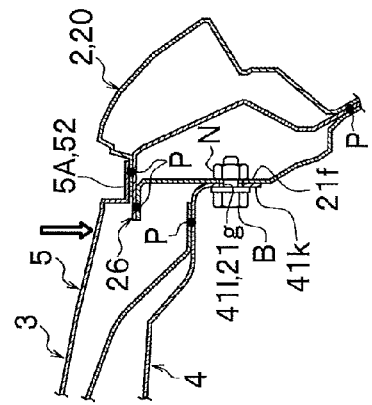
FIGS. 9A to 9C are cross-sectional views for illustrating an assembling process of the vehicle body structure in the above embodiment and correspond to FIG. 4, and FIGS. 9D to 9F are cross-sectional views for illustrating the assembling process of the vehicle body structure in the above embodiment and correspond to FIG. 5.
Figure 9B:
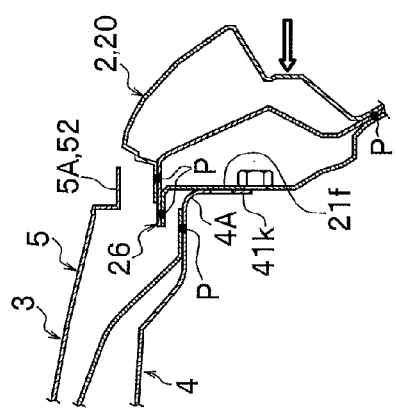
Figure 9C:
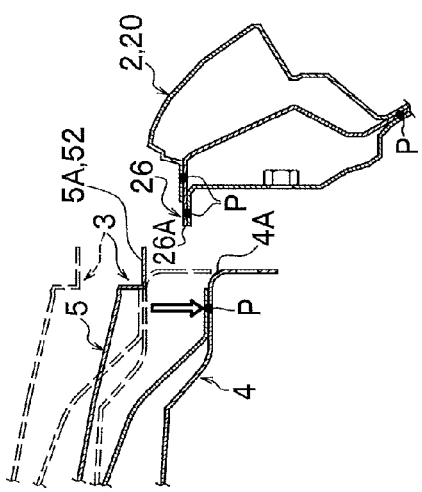
Figure 9D:
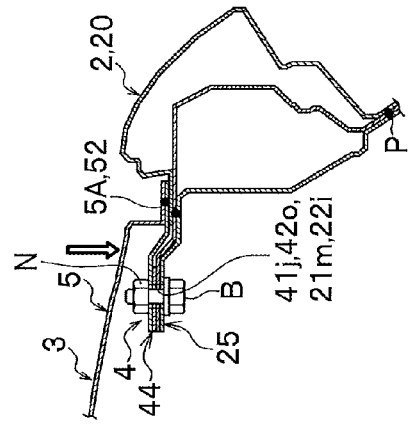
Figure 9E:
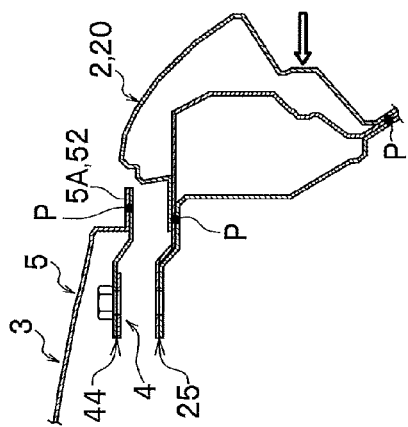
Figure 9F:
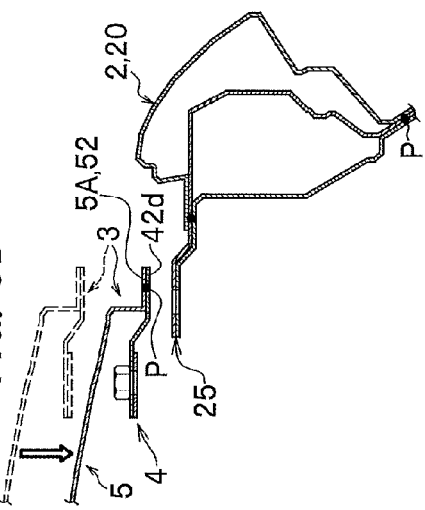

Incidentally, FIGS. 9A to 9C are cross-sectional views for illustration of an assembling process of the vehicle body structure 1 in the present embodiment, the FIGS. 9A to 9C corresponding to FIG. 4. FIGS. 9D to 9F are cross-sectional views for illustration of the assembling process of the vehicle body structure 1 in the present embodiment, the FIGS. 9D to 9F corresponding to FIG. 5.

First, pair of side components 2, 2, for which roof side rails 20, front pillars 2A, and the like are attached, are prepared in advance. In this case, as shown in FIG. 4 and FIG. 5, the roof side inner 21, the roof side stiffener 22, and the roof side outer 23 are integrally joined by welding at the upper joint flange portions 21b-23b and the lower joint flange portions 21c-23c. Further, as shown in FIG. 7, the roof side inner 21 and the roof side stiffener 22 are integrally joined by welding at the joint portion 21h and the joint portion 22e.

On the other hand, a roof component 3, for which roof arches 4 and a roof panel 5 are attached to each other, is prepared in advance. In this case, as shown in FIG. 6, the arch lower 41 and the arch upper 42 are integrally joined by welding at the front flange portions 41b, 42b and the rear flange portions 41c, 42c. Further, as shown in FIG. 5, the roof arches 4 and the roof panel 5 are integrally joined by welding at the flange extension portion 42d and the flange portion 52.

Then, in attaching the side component 2 and the roof component 3 to each other, as shown by the dashed line in FIG. 9A, a start point is set to a position where the roof component 3 is offset upward from the side component 2, and the inner end portion 26A of the mount portion 26 in the vehicle-transversal direction is offset outward in the vehicle-transversal direction from the vehicle-transversally outer end portions 4A, 5A of the roof component 3.

Then, as shown in FIG. 9A, the roof component 3 is moved downward relatively to the side component 2 so that the mount portion 26 of the roof side rail 20 is disposed at a position where the mount portion 26 overlaps in the vehicle-transversal direction with the space between the vehicle-transversally outer end portion 4A of the roof arch 4 and the vehicle-transversally outer end portion 5A of the roof panel 5 (dropping process, the first process).

Herein, as shown in FIG. 9D, the rear rail flange portion 25 of the roof side rail 20 is located at a position lower than the flange extension portion 42d of the roof arch 4 and the flange portion 52 of the roof panel 5.

Subsequently, as shown in FIG. 9B, the side component 2 is moved inward in the vehicle-transversal direction, relatively to the roof component 3, so that the mount portion 26 of the roof side rail 20 is disposed at a position where the mount portion 26 overlaps in the vehicle-transversal direction with the space between the vehicle-transversally outer end portion 4A of the roof arch 4 and the vehicle-transversally outer end portion 5A of the roof panel 5 (inserting process, the first process).

At this moment, as shown in FIG. 9B, the joint portion 21f of the roof side inner 21 comes in contact with the joint portion 41k of the roof arch 4. Thus, movement of the side component 2, the movement being inward in the vehicle-transversal direction and relative to the roof component 3, is restricted.

Further, as shown in FIG. 9E, the rear rail flange portion 25 of the roof side rail 20 is disposed below the rear arch flange portion 44 of the roof arch 4.

Further, the front rail flange portion 24 of the roof side rail 20 is disposed at a position lower than the front arch flange portion 43 of the roof arch 4 (see FIG. 8B).

Subsequently, as shown in FIG. 9C, the roof component 3 is moved downward relatively to the side component 2 so that the flange portion 52 of the roof panel 5 is mounted on the mount portion 26 of the roof side rail 20 (mounting process, the second process).

At this moment, as shown in FIG. 9F, the rear arch flange portion 44 of the roof arch 4 comes in contact with the rear rail flange portion 25 of the roof side rail 20 and is thereby stopped.

Further, the front arch flange portion 43 of the roof arch 4 comes in contact with the front rail flange portion 24 of the roof side rail 20, and is thereby stopped (see FIG. 8B).

Accordingly, as the roof panel 5 is mounted on the roof side rail 20 and the roof arch 4 comes in contact with the roof side rail 20 to be stopped, the downward movement of the roof component 3 relative to the side component 2 is restricted.

In this state, as shown in FIG. 9C, a bolt B is inserted through the bolt insertion hole 41l of the joint portion 41k and the bolt insertion hole 21g of the joint portion 21f, and is screw-engaged with a nut N so that the both are joined with each other (joint process, the third process).

Further, as shown in FIG. 9F, a bolt B is inserted through the bolt insertion holes 41j, 42o of the rear arch flange portion 44 and the bolt insertion holes 21m, 22i of the rear rail flange portion 25, and is screw-engaged with a nut N so that the both are joined with each other.

Further, the vehicle-transversally outer end portion $5B_1$ of the front end portion 5B of the roof panel 5, the front arch flange portion 43 of the roof arch 4, and the front rail flange portion 24 of the roof side rail 20 are integrally joined by welding (see FIG. 8B).

Figure 10:
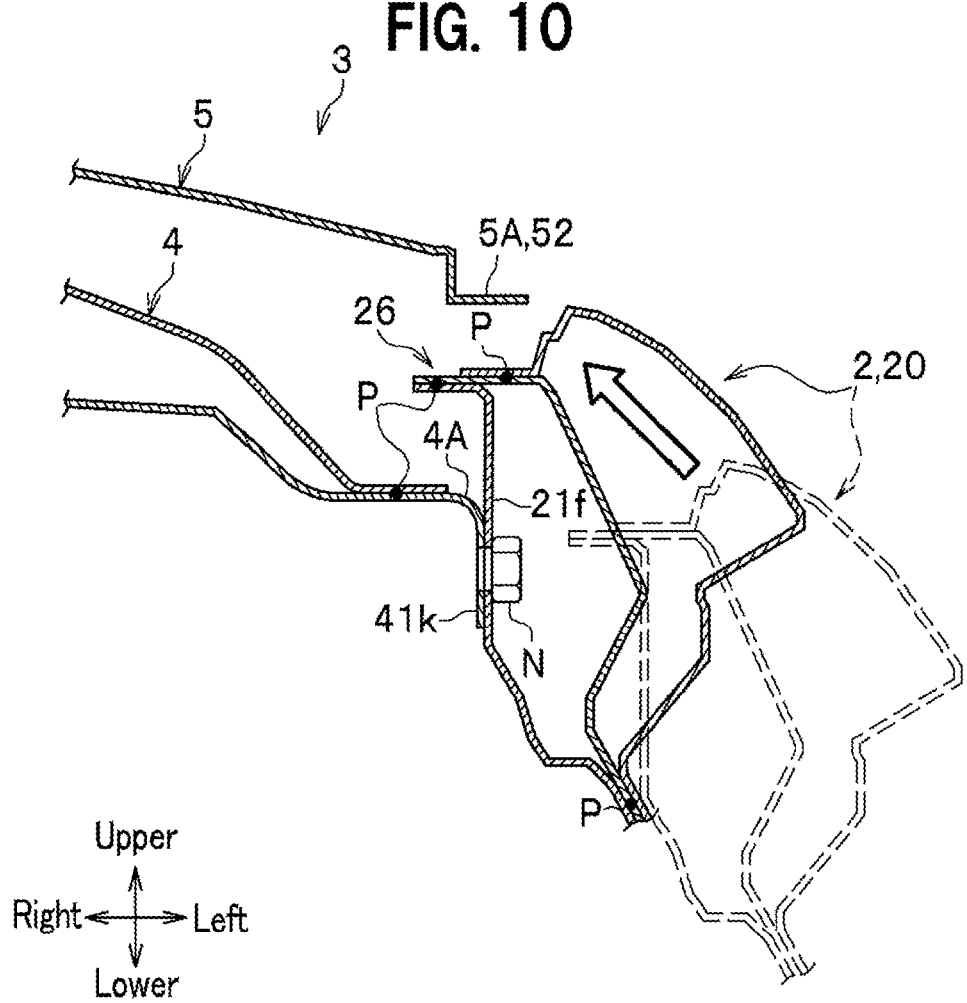
FIG. 10 is a cross-sectional view showing another assembling process of the vehicle body structure in the above-embodiment.

Incidentally, although the method for assembling in the present embodiment includes the dropping process and the inserting process, the dropping process may be omitted, as shown in FIG. 10, by moving the side component 2 obliquely upward in the vehicle-transversally inward direction relatively to the roof component 3, and disposing the mount portion 26 of the roof side rail 20 at a position where the mount portion 26 overlaps in the upper or lower direction with the space between the end portion 4A of the roof arch 4 and the end portion 5A of the roof panel 5.

According to the above-described embodiment, the outer end portion 4A of the roof arch 4 in the vehicle-transversal direction is disposed at a position spaced downward apart from the vehicle-transversally outer end portion 5A of the roof panel 5; the roof side rail 20 extends inward in the vehicle-transversal direction; and the roof side rail 20 is provided with the mount portion 26 which extends inward in the vehicle-transversal direction for mounting the vehicle-transversally outer end portion 5A of the roof panel 5. Thereby, after disposing the mount portion 26 of the roof side rail 20 from the outside in the vehicle-transversal direction at a position between the roof arch 4 and the roof panel 5 which are integrally attached to each other in advance, the roof component 3 can be easily attached to the side component 2 by only mounting the roof panel 5 onto the mount portion 26 from the above. Thus, a satisfactory workability in assembling is attained and automatization of assembling work is made easy.

In the present embodiment, the roof side rail 20 and the roof arch 4 include a front rail flange portion 24 and a rear rail flange portion 25; and a front arch flange portion 43 and a rear arch flange portion 44, respectively, which come in contact with each other to restrict the downward movement of the roof arch 4, and it is thereby possible to define the vertical position of the roof arch 4 relative to the each roof side rail 20. Accordingly, as it is possible to support the roof arch 4 by the front rail flange portions 24 and the like while supporting the roof panel 5 by mount portions 26, the roof component 3 can be stably attached to the side components 2.

Particularly, compared with the conventional technology (the invention disclosed by Patent Document 2) in which roof arches 4 and a roof panel 5 are mounted onto side components 2 from above, it is possible in the present embodiment to assemble the vehicle body structure 1 for which strength and stiffness can be appropriately ensured by only adding two processes, namely a dropping process and an inserting process. That is, even without a significant modification of conventional assembling processes, the vehicle body structure 1, for which strength and stiffness are appropriately ensured, can be assembled, and as significant change in the facility on an assembling line or in the working attitude of a worker is unnecessary, it is possible to reduce an increase in manufacturing cost and an increase in the working load on the worker even with an increase in the number of assembling processes.

Further, according to the present embodiment, the vehicle-transversally outer end portion 4A of a roof arch 4 is located in the vehicle-transversal direction outside the vehicle-transversally inner end portion 26A of the mount portion 26, and further, the end portion 4A is directly joined with the joint portions 21f of the roof side rail 20 at the joint portions 41k. Thus, it is unnecessary to crush the cross-sectional shape of a roof arch 4, and the strength and the stiffness are increased, compared with the conventional technology (the invention disclosed by Patent Document 1) in which a roof arch 4 has a portion with a crushed cross-sectional shape.

Still further, according to the present embodiment, as it is not necessary to use extension members nor pillar reinforcing members, the number of joint points can be thereby decreased. As a result, a higher strength and stiffness can be ensured, compared with the conventional technology (the invention disclosed by Patent Document 2) which uses extension members and pillar reinforcing members.

According to the present embodiment, the front rail flange portion 24 is formed by only the roof side inner 21, and the front arch flange portion 43 is formed by only the arch upper 42. Accordingly, three members of the roof side inner 21, the arch upper 42, and the roof panel 5 are joined together, which makes it possible to decrease the number of joint points and increase the joint strength at a joint portion, compared with a case of forming a front arch flange portion 43 by both an arch lower 41 and an arch upper 42 and a case of forming a front rail flange portion 24 by both a roof side inner 21 and a roof side stiffener 22.

According to the present embodiment, as the rear rail flange portion 25 is formed by both the roof side inner 21 and the roof side stiffener 22, the strength of the rear rail flange portion 25 can be increased.

Further, as the rear arch flange portion 44 is formed by both the arch lower 41 and the arch upper 42, the strength of the rear arch flange portion 44 can be increased.

According to the present embodiment, the joint portions $21h$, $22e$ are provided at a position between the front rail flange portion 24 and the rear rail flange portion 25, the position being the intersection of the roof side rail 20 and the roof arch 4, and the roof side inner 21 and the roof side stiffener 22 are joined at the joint portions $21h$, $21e$. Thus, the roof side inner 21 and the roof side stiffener 22 can be directly joined also at this intersection, which increases the stiffness of the closed cross-section of the roof side rail 20.

According to the present embodiment, the front rail flange portion 24, the front arch flange portion 43, and the like are formed on both the roof side rail 20 and the roof arch 4. Thus, compared with a case of forming the flange portion only on one of the roof side rail 20 and the roof arch 4, it is possible to simplify the shapes of the front rail flange portion 24, the front arch flange portion 43, and the like, and improve the formability of the front rail flange portion 24, the front arch flange portion 43, and the like.

According to the present embodiment, the joint portion $41k$ extends in the vertical direction; the joint portion $21f$ extends in parallel to the joint portion $41k$; and thus the joining surface between these becomes vertical. The formability of the roof arch 4 thereby becomes satisfactory. Further, the side component 2 is moved in the vehicle-transversal direction toward the roof component 3; the joint portion $21f$ is hit against the joint portion $41k$ to define the position in the vehicle-transversal direction; and thereafter the roof component 3 is vertically moved to enable position adjustment. Accordingly, it is unnecessary to simultaneously move the roof component 3 downward and move the side component 2 inward in the vehicle-transversal direction, and the work for attaching the both to each other thereby becomes simple and easy.

According to the present embodiment, as the roof arch 4 includes the flange extension portion $42d$ for joining with the flange portion 52 of the roof panel 5, positioning of the both can be accurately performed in attaching the roof arch 4 and the roof panel 5 to each other, which improves the accuracy of the relative position between the two.

An embodiment according to the present invention has been described above in detail, however, the invention is not limited thereto, and modifications and changes can be made, as appropriate, without departing from the spirit of the invention.

The present embodiment has been described, taking an example of a case of applying a vehicle body structure 1 according to the invention to the connection portion of the frontmost roof arch 4 and side components 2, it is of course also possible to apply the vehicle body structure 1 to the roof arch 4 disposed at the center and the roof arch 4 disposed at the rear.

Further, although, in the present embodiment, the front rail flange portion 24 is formed by one member that is the roof side inner 21, the invention is not limited thereto, and the front rail flange portion 24 may be formed by one member that is the roof side stiffener 22 and may be formed by two members that are the roof side inner 21 and the roof side stiffener 22.

Still further, although, in the present embodiment, the rear rail flange portion 25 is formed by two members that are the roof side inner 21 and the roof side stiffener 22, the invention is not limited thereto, and the rear rail flange portion 25 may be formed by one member that is either the roof side inner 21 or the roof side stiffener 22.

Yet further, although, in the present embodiment, the front arch flange portion 43 is formed by one member that is the arch upper 42, the invention is not limited thereto, and the front arch flange portion 43 may be formed by one member that is the arch lower 41, and may be formed by two members that are the arch lower 41 and the arch upper 42.

Further, in the present embodiment, the rear arch flange portion 44 is formed by two members that are the arch lower 41 and the arch upper 42, the invention is not limited thereto, and the rear arch flange portion 44 may be formed by one member that is either the arch lower 41 or the arch upper 42.

Figure 11A:
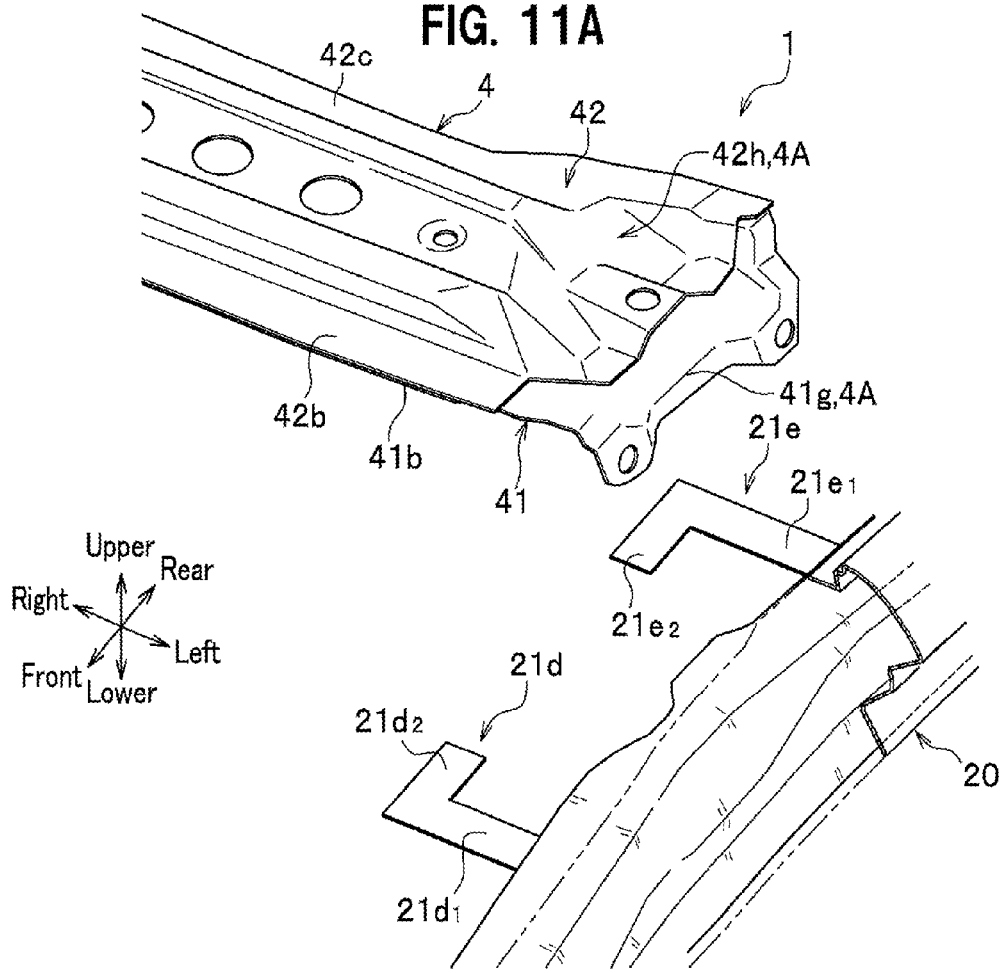
FIG. 11A is a partial exploded perspective cut view showing a side rail and a roof arch of a vehicle body structure in a modified example.

Still further, as shown in FIG. 11A, it is also possible to omit the vehicle-transversally outer end portions 41i, 42n of the rear flange portion 41c and the rear flange portion 42c on the one hand, and modify the structures of the front flange portion 21d and the rear flange portion 21e of the roof side inner 21 on the other hand. Incidentally, FIG. 11A is a partial exploded perspective cut view showing a roof side rail 20 and a roof arch 4 of a vehicle body structure 1 in a modified example, and FIG. 11B is a vertical cross-sectional view of the vehicle body structure 1 in the modified example, with a cut in the front or rear direction.

As shown in FIG. 11A, the front flange portion 21d in the modified example is disposed with a predetermined interval forward from the end portion 4A of the roof arch 4, and is provided with an extension portion $21d_1$ extending inward in the vehicle-transversal direction and a support portion $21d_2$ extending backward from the extension end of this extension portion $21d_1$ to the lower side of the roof arch 4. Further, the rear flange portion 21e is disposed with a predetermined interval backward from the end portion 4A (extension portion $21d_1$) of the roof arch 4, and is provided with an extension portion $21e_1$ extending inward in the vehicle-transversal direction and a support portion $21e_2$ extending forward from the extension end of this extension portion $21e_1$ to the lower side of the roof arch 4.

Figure 11B:
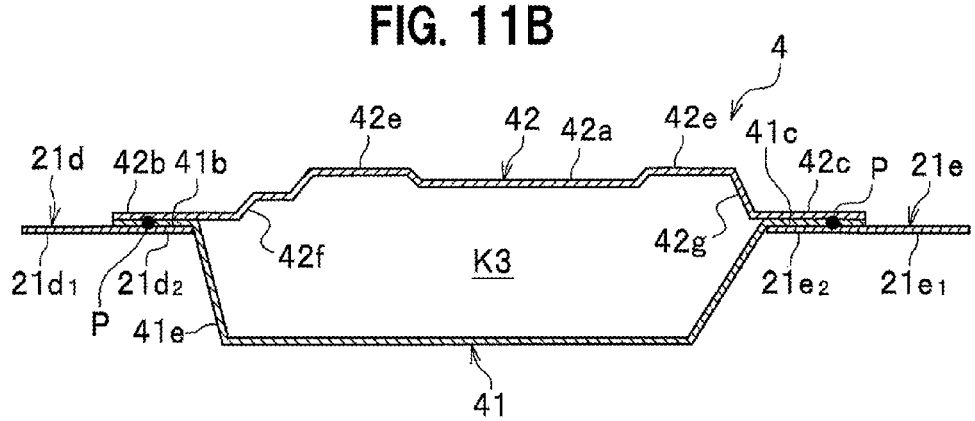
FIG. 11B is a vertical cross-sectional view of the vehicle body structure in the modified example, with a cut in the front or rear direction.

As shown in FIG. 11B, the support portion $21d_2$ functions as a stopper by contact with the front flange portion 41b of the arch lower 41 to stop the arch lower 41. Further, the support portion $21e_2$ functions as a stopper by contact with the rear flange portion 41c of the arch lower 41. By such a structure, as the flange portion for contact between the roof side rail 20 and the roof arch 4 is formed only on the roof side rail 20, the shape of the roof arch 4 can be simplified to thereby improve the formability of the roof arch 4, compared with a case of forming a flange portion also on the roof arch 4.

Further, as shown in FIG. 12A, it is also possible to omit the front flange portion 21d, the rear flange portion 21e, and the flange portion 22d on the one hand, and modify the structures of the front flange portion 42b and the rear flange portion 42c of the arch upper 42 on the other hand. Incidentally, FIG. 12A is a partial exploded perspective cut view showing the roof side rail 20 and the roof arch 4 of the vehicle body structure 1 in another modified example, and FIG. 12B is a vertical cross-sectional view of the vehicle body structure 1 in the other modified example, with a cut in the vehicle-transversal direction.

As shown in FIG. 12A, the front flange portion 42b in the modified example is provided with an extension portion 42b1 extending forward compared with other portions, and a support portion 42b2 extending outward in the vehicle-transversal direction from the extension end of this extension portion 42b1 to a point above the roof side rail 20. Further, the rear flange portion 42c is provided with an extension portion 42c1 extending backward compared with other portions, and a support portion 42c2 extending outward in the vehicle-transversal direction from the extension end of this extension portion 42c1 to a point above the roof side rail 20. The respective extension portions 42b1, 42c1 are provided with a predetermined interval inward in the vehicle-transversal direction from the vehicle-transversally outer end portion 42h (the end edge of the end portion 42h in detail) of the arch upper main body 42a.

As shown in FIG. 12B, the support portions $42b_2$, $42c_2$ are stopped by contact with the upper surface of the upper joint flange portion 23b of the roof side outer 23. By such a structure, as the flange portion for contact between the roof side rail 20 and the roof arch 4 is formed only on the roof arch 4, the shape of the roof side rail 20 can be simplified to thereby improve the formability of the roof side rail 20, compared with a case of forming a flange portion also on the roof side rail 20.

Figure 13A:
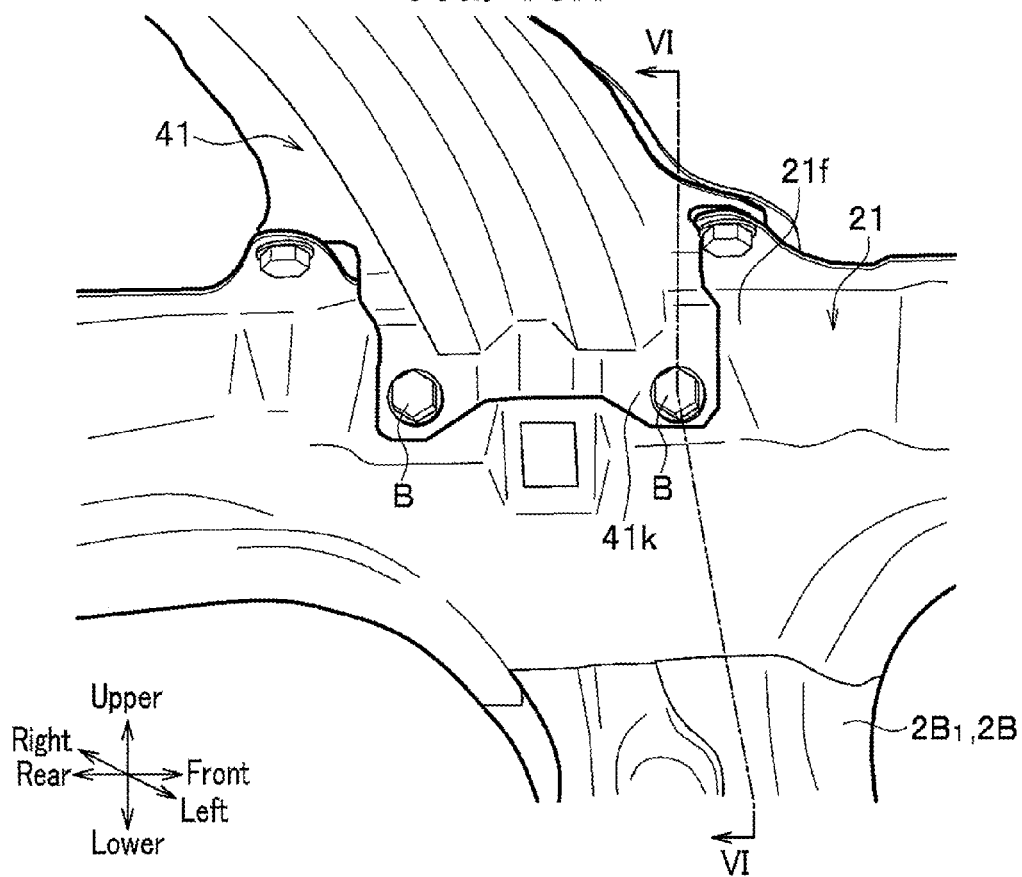
FIG. 13A is a perspective view of the intersection portion between a roof side inner, an arch lower, and a center pillar, viewed from the vehicle interior side.
Figure 13B:
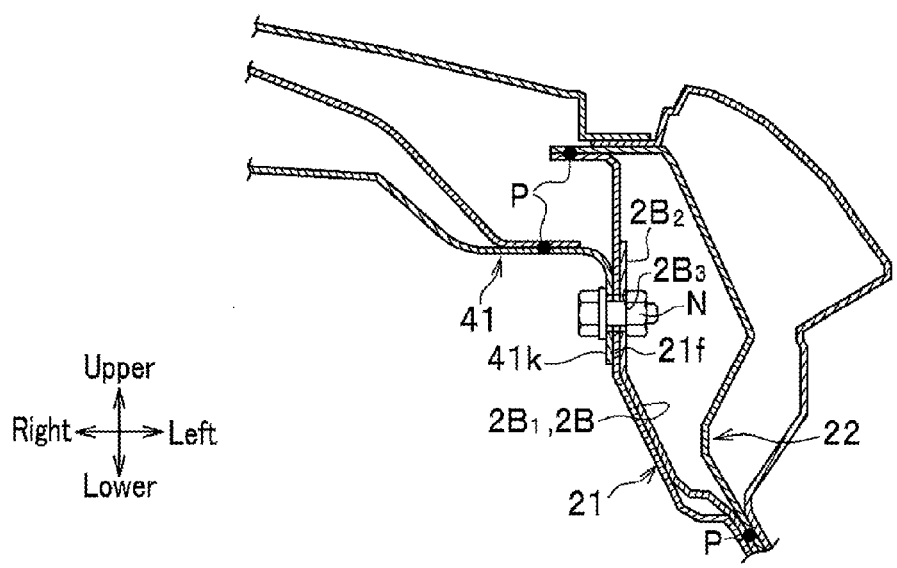
FIG. 13B is a cross-sectional view taken along line VI-VI of FIG. 13A.
Figure 14A:
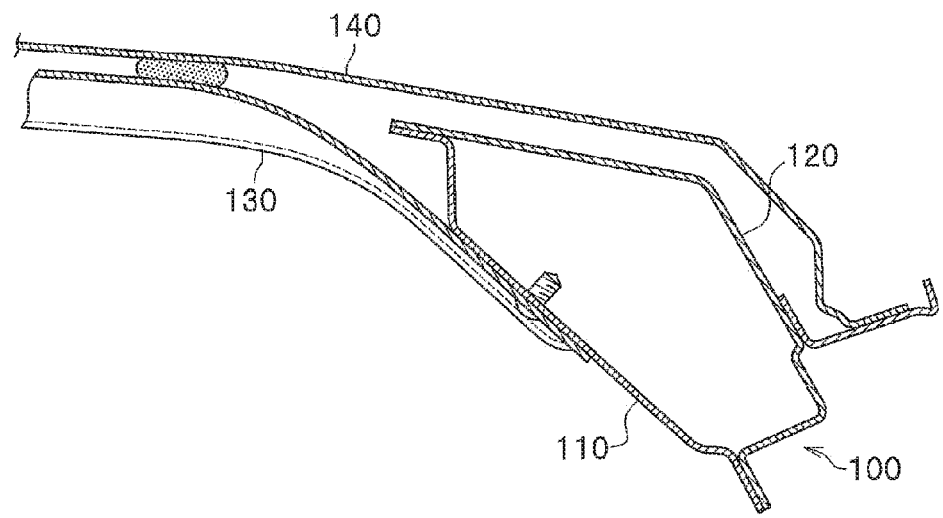
FIG. 14A is a partial vertical cross-sectional view of a vehicle body structure in a conventional example by Patent Document 1, with a cut in the vehicle-transversal direction.
Figure 14B:
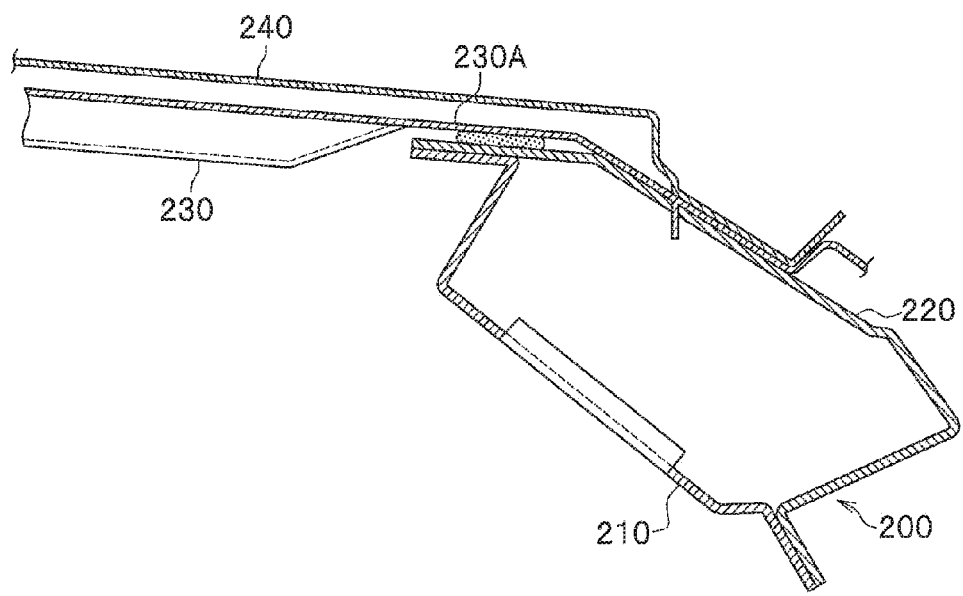
FIG. 14B is partial vertical cross-sectional view of the vehicle body structure, with a cut in the vehicle-transversal direction.
Figure 15A:
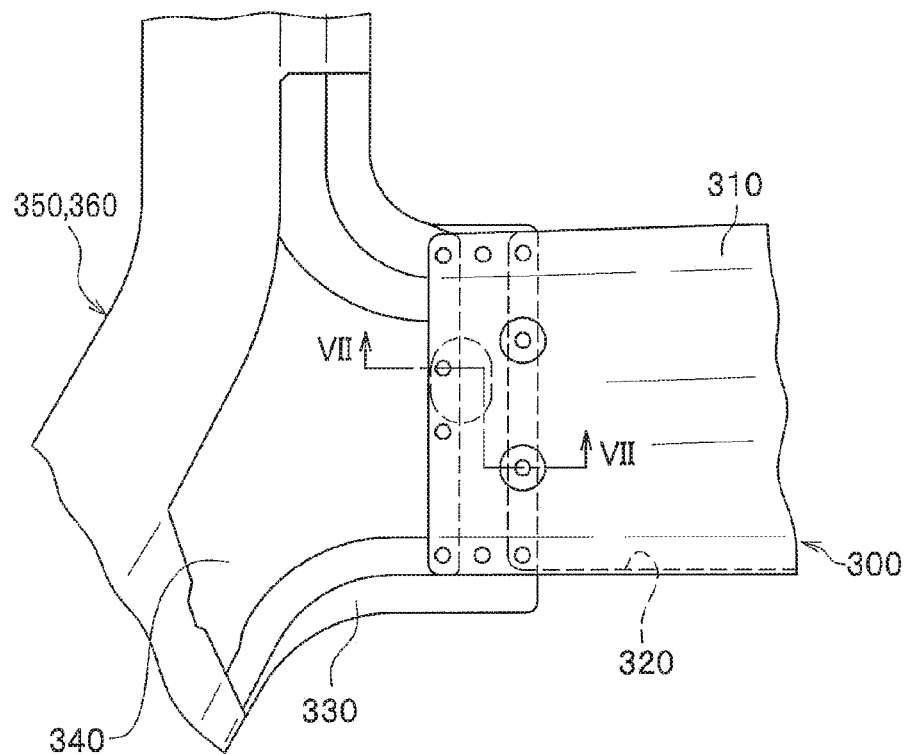
FIG. 15A is a plan view showing the vehicle body structure by the invention disclosed by Patent Document 2.
Figure 15B:
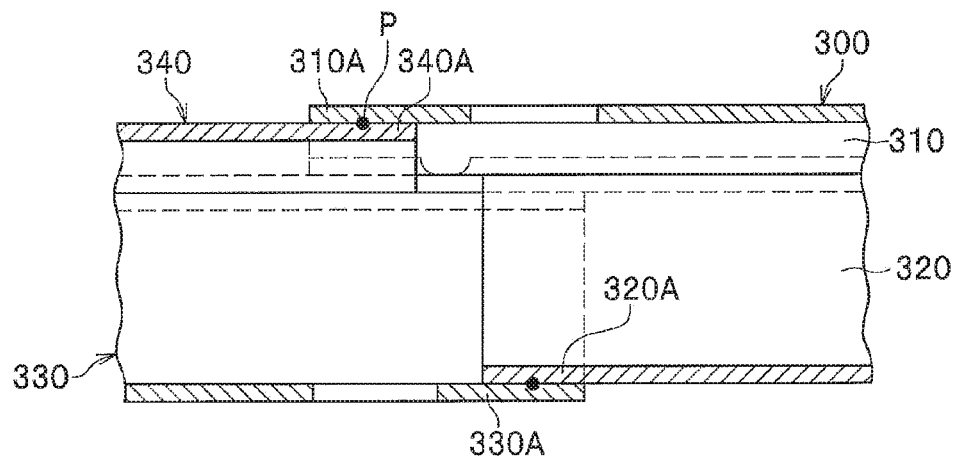
FIG. 15B is a cross-sectional view, taken along line VII-VII in FIG. 15A.

Further, as shown in FIGS. 13A and 13B, the joint portion 21f of the roof side inner 21, the joint portion 41k of the arch lower 41, and the center pillar inner 2B₁ of the center pillar 2B may be integrally joined by a bolt B. Incidentally, FIG. 13A is a perspective view of the intersection portion between the roof side inner 21, the arch lower 41, and the center pillar 2B, viewed from the vehicle interior side, and FIG. 13B is a cross-sectional view taken along line VI-VI of FIG. 13A. The present modified example will be described, taking an example of a case of application is made to the connection portion between a roof arch 4 (see FIG. 1) and a side component 2.

As shown in FIG. 13B, the upper end portion 2B₂ of the center pillar inner 2B₁ forming a part of the center pillar 2B is disposed between the roof side inner 21 and the roof side stiffener 22, and extends in parallel to the joint portion 21f. The upper end portion 2B₂ of the center pillar inner 2B₁ is provided with a bolt insertion hole 2B₃ which a bolt B is inserted through, and is integrally joined by the bolt B with the roof side inner 21 and the arch lower 41, in contact with the vehicle-transversally outer side of the joint portion 21f. By such a structure, as the roof side rail 20, the center pillar 2B, and the roof arch 4 are integrally joined, the number of joint points can be decreased, and the stiffness at the intersection portion between the roof side rail 20, the center pillar 2B, and the roof arch 4 is increased. Incidentally, the structures in the modified example can be of course applied to a front pillar 2A, a rear pillar 2C, and the like.

Further, although, in the present embodiment, the front flange portion 21d that contacts with the front flange portion 42b of the arch upper 42 is provided on the roof side rail 20, a flange portion that contacts with the front flange portion 42b of the arch upper 42 may be provided on the front pillar 2A.

DESCRIPTION OF REFERENCE CHARACTERS 1 vehicle body structure
2 side component
20 roof side rail
21 roof side inner
21d front flange portion
21e rear flange portion
21f joint portion (rail-side joint portion)
21h joint portion
$21d_1$ extension portion (flange portion)
$21d_2$ support portion (flange portion)
$21e_1$ extension portion (flange portion)
$21e_2$ support portion (flange portion)
22 roof side stiffener
22d flange portion
22e joint portion
23 roof side outer
24 front rail flange portion (flange portion, second flange portion)
25 rear rail flange portion (flange portion, second flange portion)
26 mount portion
26A inner end portion in a vehicle-transversal direction or vehicle-transversally inner end portion
2A front pillar (pillar)
2B center pillar (pillar)
$2B_1$ center pillar inner
$2B_2$ upper end portion
2C rear pillar (pillar)
3 roof component
4 roof arch
4A outer end portion in a vehicle-transversal direction or vehicle-transversally outer end portion
41 arch lower
41b front flange portion
41c rear flange portion
41d side flange portion
41k joint portion (roof-side joint portion)
42 arch upper
42b front flange portion
42c rear flange portion
42d flange extension portion
$42b_1$ extension portion (flange portion)
$42b_2$ support portion (flange portion)
$42c_1$ extension portion (flange portion)
$42c_2$ support portion (flange portion)
43 front arch flange portion (flange portion, first flange portion)
44 rear arch flange portion (flange portion, first flange portion)
5 roof panel
5A outer end portion in a vehicle-transversal direction or vehicle-transversally outer end portion
5B front end portion
K1, K2, K3 closed cross-section

The invention claimed is:

1. A vehicle body structure, comprising:
a pair of side components that are provided on left and right sides of a vehicle body, respectively, and form side portions of the vehicle body; and
a roof component including a roof arch disposed between paired side components; and a roof panel fixed to an upper portion of the roof arch and forming an upper surface of the vehicle body;
wherein each of the side components includes a roof side rail disposed at an upper side edge of the vehicle body and extending in a front or rear direction,
wherein the roof side rail includes a mount portion extending inward in the vehicle-transversal direction and including a vehicle-transversally outer end portion of the roof panel mounted thereto,
wherein the roof arch extends between the side components and includes an arch lower and an arch upper disposed at a position upper than the arch lower,
wherein the arch lower and the arch upper are joined together to form a closed cross-section,
wherein the roof arch includes a vehicle-transversally outer end portion that is located outside a vehicle-transversally inner end of the mount portion in the vehicle-transversal direction and is joined with the roof side rail,
wherein the vehicle-transversally outer end portion of the roof arch is spaced apart downward from the vehicle-transversally outer end portion of the roof panel,
wherein at least one of the roof arch and the roof side rail includes a flange portion that extends toward the other one of the roof arch and the roof side rail and comes into contact with said other one of the roof arch and the roof side rail to restrict downward movement of the roof arch,
wherein the flange portion is located at a position upper than the vehicle-transversally outer end portion of the roof arch,
wherein the mount portion is located between the roof panel and the roof arch with said other one of the roof arch and the roof side rail contacting with the flange portion,
wherein the vehicle-transversally outer end portion of the roof panel is mounted on the mount portion,
wherein the flange portion includes: a first flange portion formed on the roof arch; and a second flange portion formed on the roof side rail and disposed at a position where the second flange portion and the first flange portion vertically overlap with each other,
wherein the first flange portion includes a front arch flange portion extending forward from a front end portion of the roof arch and a rear arch flange portion extending backward from a rear end portion of the roof arch,
wherein the front arch flange portion is formed by one of the arch lower and the arch upper, and
wherein the rear arch flange portion is formed by the arch lower and the arch upper.

2. The vehicle body structure according to claim 1, wherein the first flange portion includes a flange extension portion that extends outward in the vehicle-transversal direction and is joined with the vehicle-transversally outer end portion of the roof panel.

3. The vehicle body structure according to claim 1, wherein the flange portion includes:
an extension portion extending inward in the vehicle-transversal direction from the roof side rail, at a position that is offset in the front or rear direction from the roof arch; and
a support portion extending from an extension end of the extension portion to a lower side of the roof arch.

4. The vehicle body structure according to claim 1, wherein the flange portion includes:
an extension portion extending in the front or rear direction from a position that is spaced apart inward in the vehicle-transversal direction at a predetermined interval from the vehicle-transversally outer end portion of the roof arch; and a support portion extending from an extension end of the extension portion to an upper side of the roof side rail.

5. A vehicle body structure, comprising:

a pair of side components that are provided on left and right sides of a vehicle body, respectively, and form side portions of the vehicle body; and a roof component including a roof arch disposed between paired side components; and a roof panel fixed to an upper portion of the roof arch and forming an upper surface of the vehicle body;

wherein each of the side components includes a roof side rail disposed at an upper side edge of the vehicle body and extending in a front or rear direction, wherein the roof side rail includes a mount portion extending inward in the vehicle-transversal direction and including a vehicle-transversally outer end portion of the roof panel mounted thereto, wherein the roof arch includes a vehicle-transversally outer end portion that is located outside a vehicle-transversally inner end of the mount portion in the vehicle-transversal direction and is joined with the roof side rail, wherein the vehicle-transversally outer end portion of the roof arch is spaced apart downward from the vehicle-transversally outer end portion of the roof panel, wherein at least one of the roof arch and the roof side rail includes a flange portion that extends toward the other one of the roof arch and the roof side rail and comes into contact with said other one of the roof arch and the roof side rail to restrict downward movement of the roof arch, wherein the flange portion is located at a position upper than the vehicle-transversally outer end portion of the roof arch, wherein the mount portion is located between the roof panel and the roof arch with said other one of the roof arch and the roof side rail contacting with the flange portion, wherein the vehicle-transversally outer end portion of the roof panel is mounted on the mount portion, wherein the flange portion includes: a first flange portion formed on the roof arch; and a second flange portion formed on the roof side rail and disposed at a position where the second flange portion and the first flange portion vertically overlap with each other, wherein the roof side rail is formed by joining a roof side inner on a vehicle interior side and a roof side stiffener on a vehicle exterior side such as to form a closed cross-section, wherein the second flange portion includes:

a front rail flange portion extending inward in the vehicle-transversal direction from a vehicle-transversally inner end portion of the roof side rail; and a rear rail flange portion provided with a predetermined interval backward from the front rail flange portion and extending inward in the vehicle-transversal direction from the vehicle-transversally inner end portion of the roof side rail, wherein the front rail flange portion is formed by one of the roof side inner and the roof side stiffener, and wherein the rear rail flange portion is formed by the roof side inner and the roof side stiffener.

6. The vehicle body structure according to claim 5, wherein the roof side inner and the roof side stiffener are joined at respective joint portions provided between the front rail flange portion and the rear rail flange portion.

7. The vehicle body structure according to claim 5, wherein the first flange portion includes a flange extension portion that extends outward in the vehicle-transversal direction and is joined with the vehicle-transversally outer end portion of the roof panel.

8. The vehicle body structure according to claim 5, wherein the flange portion includes:

an extension portion extending inward in the vehicle-transversal direction from the roof side rail, at a position that is offset in the front or rear direction from the roof arch; and a support portion extending from an extension end of the extension portion to a lower side of the roof arch.

9. The vehicle body structure according to claim 5, wherein the flange portion includes:

an extension portion extending in the front or rear direction from a position that is spaced apart inward in the vehicle-transversal direction at a predetermined interval from the vehicle-transversally outer end portion of the roof arch; and a support portion extending from an extension end of the extension portion to an upper side of the roof side rail.

10. A vehicle body structure, comprising:

a pair of side components that are provided on left and right sides of a vehicle body, respectively, and form side portions of the vehicle body; and a roof component including a roof arch disposed between paired side components; and a roof panel fixed to an upper portion of the roof arch and forming an upper surface of the vehicle body;

wherein each of the side components includes a roof side rail disposed at an upper side edge of the vehicle body and extending in a front or rear direction, wherein the roof side rail includes a mount portion extending inward in the vehicle-transversal direction and including a vehicle-transversally outer end portion of the roof panel mounted thereto, wherein the roof arch includes a vehicle-transversally outer end portion that is located outside a vehicle-transversally inner end of the mount portion in the vehicle-transversal direction and is joined with the roof side rail, wherein the vehicle-transversally outer end portion of the roof arch is spaced apart downward from the vehicle-transversally outer end portion of the roof panel, wherein at least one of the roof arch and the roof side rail includes a flange portion that extends toward the other one of the roof arch and the roof side rail and comes into contact with said other one of the roof arch and the roof side rail to restrict downward movement of the roof arch, wherein the flange portion is located at a position upper than the vehicle-transversally outer end portion of the roof arch, wherein the mount portion is located between the roof panel and the roof arch with said other one of the roof arch and the roof side rail contacting with the flange portion, wherein the vehicle-transversally outer end portion of the roof panel is mounted on the mount portion, wherein the vehicle-transversally outer end portion of the roof arch is provided with an arch-side joint portion extending in a vertical direction, wherein a vehicle-transversally inner end portion of the roof side rail is provided with a rail-side joint portion extending in parallel with the arch-side joint portion, wherein each of the side components includes a pillar including an upper end portion joined with the roof side rail, wherein the upper end portion of the pillar extends to a position where the upper end portion of the pillar overlaps with the arch-side joint portion and the rail-side joint portion in the vehicle-transversal direction, and wherein the upper end portion of the pillar is integrally joined with the arch-side joint portion and the rail-side joint portion.

* * * * *